United States Patent [19]
Saito

[11] Patent Number: 5,877,774
[45] Date of Patent: Mar. 2, 1999

[54] LINE SYMMETRICAL GRAPHIC ARRANGEMENT DEVICE FOR CREATING LINE SYMMETRICAL GRAPHICS WITH RESPECT TO A SYMMETRY AXIS

[75] Inventor: Shigeru Saito, Tokyo, Japan

[73] Assignee: NEC Corporation, Tokyo, Japan

[21] Appl. No.: 697,529

[22] Filed: Aug. 26, 1996

[30] Foreign Application Priority Data

Aug. 25, 1995 [JP] Japan .................................. 7-240897

[51] Int. Cl.$^6$ .................................................. G06T 15/00
[52] U.S. Cl. ................................................................ 345/440
[58] Field of Search .............................. 345/433, 437–8, 345/441, 440; 364/474.24

[56] References Cited

U.S. PATENT DOCUMENTS

| | | | |
|---|---|---|---|
| 4,933,865 | 6/1990 | Yamamoto et al. | 382/203 |
| 5,463,696 | 10/1995 | Beernink et al. | 382/186 |
| 5,463,722 | 10/1995 | Venolia | 345/433 |
| 5,548,695 | 8/1996 | Asano et al. | 345/433 |
| 5,664,081 | 9/1997 | Saito | 345/433 |

FOREIGN PATENT DOCUMENTS

| | | |
|---|---|---|
| 63-024460 | 2/1988 | Japan . |
| 63-261481 | 10/1988 | Japan . |
| 3-103992 | 4/1991 | Japan . |

*Primary Examiner*—Rudolph J. Buchel, Jr.
*Attorney, Agent, or Firm*—Foley & Lardner

[57] ABSTRACT

A line symmetrical graphic arrangement device comprises a characteristic quantity computing unit for computing characteristic quantity depending on the shape of an input graphic and selecting a characteristic point used for the graphic arrangement, a proposed symmetry axis computing unit and a symmetry judging unit for requiring proposed symmetry axes of the input graphic based on the characteristic of the shape and the quality of the symmetry axes in the input graphic, a base point computing unit and an axis angle deciding unit for modifying the proposed symmetry axes on the basis of the quality of the symmetry axes, so as to obtain the symmetry axes of the input graphic, and a characteristic point position computing unit for relocating the characteristic points selected by the characteristic quantity computing means with the obtained symmetry axes as reference, so as to create a symmetrical graphic with respect to the symmetry axes.

11 Claims, 21 Drawing Sheets

70

RADIUS
CENTER
ENDPOINT

CHARACTERISTIC POINT GROUP 2

CHARACTERISTIC POINT GROUP 1

DISTANCE α2  DISTANCE α1

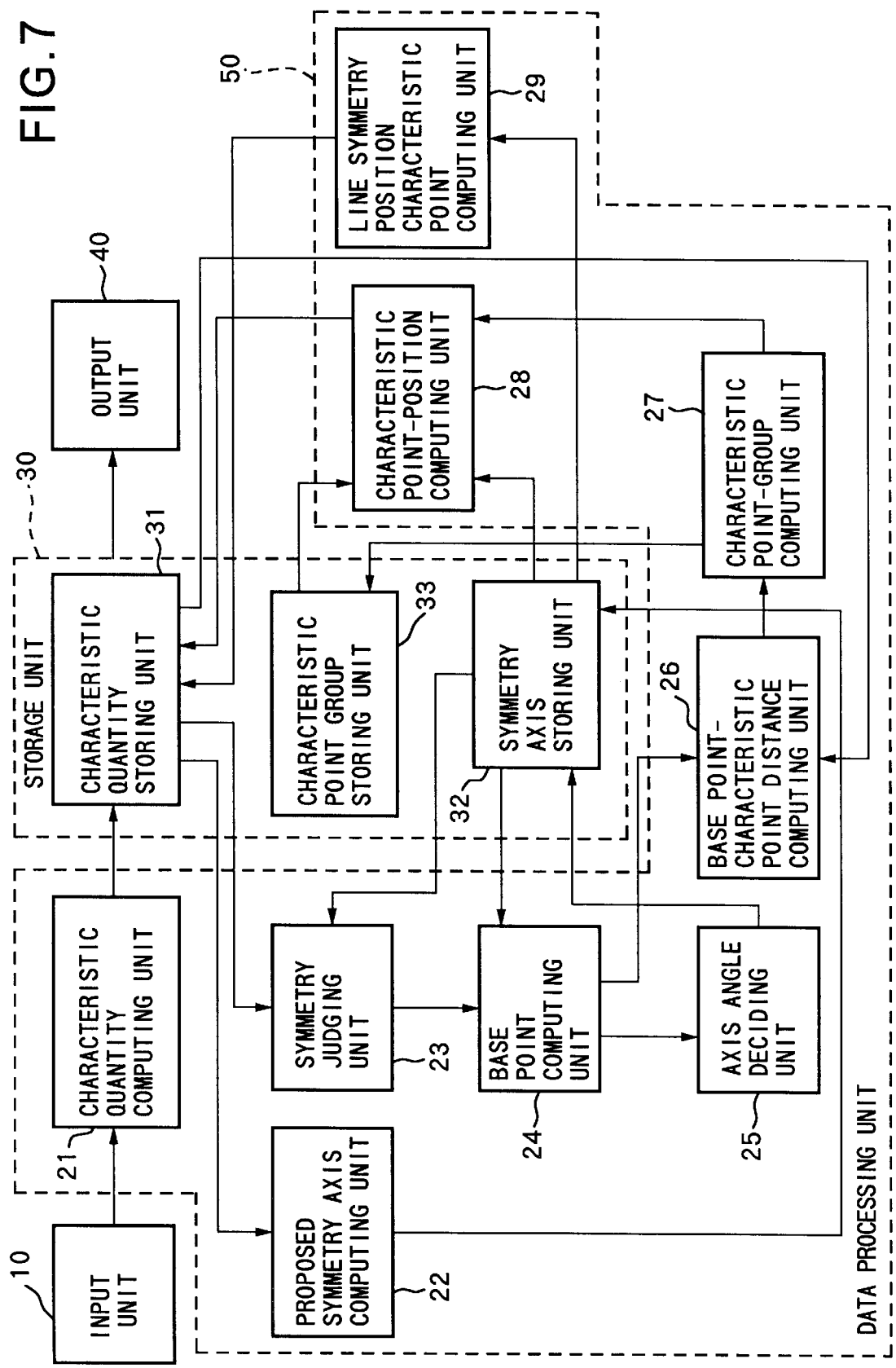

FIG.15
(PRIOR ART)
(A)
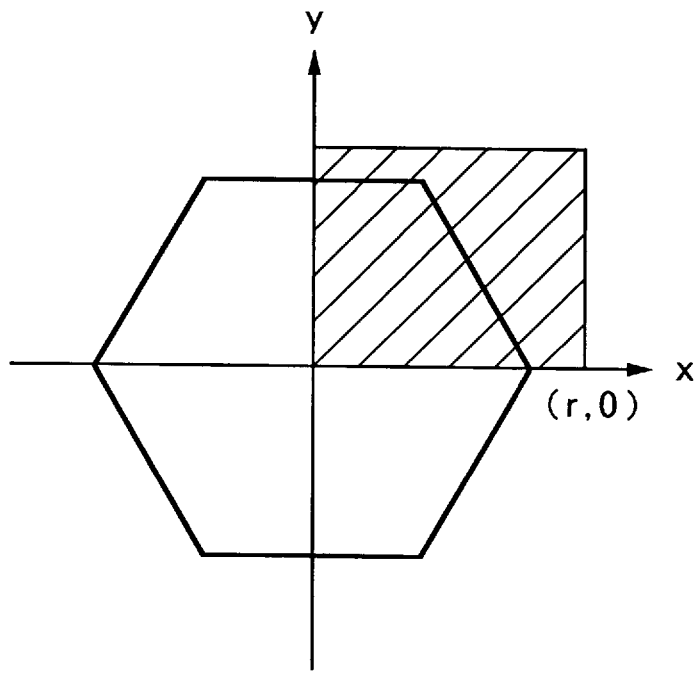
(B)
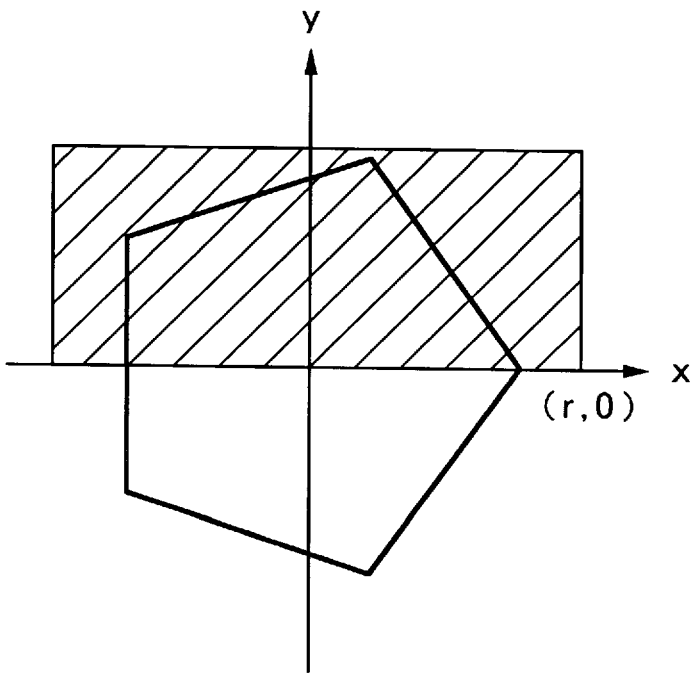

LINE SYMMETRICAL GRAPHIC ARRANGEMENT DEVICE FOR CREATING LINE SYMMETRICAL GRAPHICS WITH RESPECT TO A SYMMETRY AXIS

BACKGROUNDS OF THE INVENTION

1. Field of the Invention

The present invention relates to a graphic arrangement device capable of arranging input graphics. More particularly, it relates to a line symmetrical graphics arrangement device capable of arranging input graphics into line symmetrical figures with respect to a symmetry axis.

2. Description of the Related Art

The conventional graphic arrangement devices for arranging input graphics includes, by way of example, "A Device for Calculating Vertices of a Regular Polygon" disclosed in Japanese Patent Laid-Open No. 3-103992, "A Graphic Processor Having a Function of Creating a Regular Polygon" disclosed in Japanese Patent Laid-Open No. 63-24460, "A Method of Recognizing Symmetry of Graphics in a Graphic Recognizing Device" disclosed in Japanese Patent Laid-Open No. 63-261481, and the like.

The device disclosed in Japanese Patent Laid-Open No. 3-103992, "A Device for Calculating Vertices of a Regular Polygon", as a first example of the conventional arts, is used in order to calculate coordinates of vertices of a regular polygon.

FIG. 13 is a block diagram showing a constitution of a graphic arrangement device according to the first conventional art disclosed in the same. With reference to FIG. 13, the graphic arrangement device according to the first conventional art comprises a data input unit 111, a coordinate value computing unit 112, a sign reversing unit 133 and a data output unit 114.

FIG. 14 is a flow chart for use of describing a flow of processing in the graphic arrangement device indicated in FIG. 13. FIG. 15 is a view showing a range of vertices of a regular polygon, which vertices are calculated by the coordinate value computing unit 112 of the graphic arrangement device of FIG. 13. An operation on the graphic arrangement device will be, hereinafter, described referring to FIGS. 13 to 15.

The data input unit 111 judges whether the number of angles N is odd or even (Step 1402) when receiving a radius r of a circumscribed circle, coordinates (x, y) of a center, the number of angles N (also referred to as "the number of vertices") (Step 1401).

When the number of angles N is even, the coordinate value computing unit 112 calculates the values of the coordinates of a vertex existing in the first quadrant, as indicated in FIG. 15(A) (Step 1403). The following well-known formulas (1) and (2) are used in order to calculate the values of the coordinates.

$$Xi = \cos(\theta i - 1 + \Delta\theta) \times r \quad (1)$$

$$Yi = \sin(\theta i - 1 + \Delta\theta) \times r \quad (2)$$

Here, in the above formulas (1) and (2), the following expressions are substituted; $\Delta\theta = 2\pi/N$, $\theta i - 1 = \Delta\theta \times (I-2)$ (i=2, ..., N)

The sign reversing unit 113 computes the respective coordinate values in the second, third and fourth quadrants by reversing sign of the coordinate values computed by the coordinate value computing unit 112, with respect to one of an X-coordinate and a Y-coordinate and with respect to the both coordinates (Step 1404).

While, when the number of angles N is odd, the coordinate value computing unit 112 computes the coordinate values of vertices existing in the first and fourth quadrants, as indicated in FIG. 15(B) (Step 1405). The sign reversing unit 113 computes the coordinate values of the vertices in the second and third quadrants by reversing the sign of the computed coordinate values (Step 1406).

Finally, adding the coordinate values (x, y) of the center of a circumscribed center to the coordinate values of each vertex computed through the above steps, makes the polygon in a position to permit parallel translation to the original position, which serves as the output from the data output unit 114 (Step 1407).

This time, a graphic arrangement device according to the second example of the conventional arts, disclosed in Japanese Patent No. 63-24460 "A Graphic Processor Having a Function of Creating a Regular Polygon" will be described. The graphic arrangement device disclosed in the same is used in order to arrange a polygon of any shape into a regular polygon.

FIG. 16 is a block diagram showing a constitution of the graphic arrangement device disclosed in the same. Referring to FIG. 16, the graphic arrangement device according to the second conventional art comprises a control processor 240, a memory 212, a keyboard 222, a coordinate position appointing means (mouse) 224, an input interface 230, a display monitor 232, a bitmap memory 234, a display processor 236 and an internal bus 238. The memory 212 comprises a program unit 214, a document buffer 216 and a working area 218.

FIG. 17 is a flow chart for use of describing a flow of processing in the graphic arrangement device according to the second conventional art. FIG. 18 is a view for use of describing an operation of the graphic arrangement device according to the second conventional art when an input graphic is a triangle. An operation of the graphic arrangement device will be, hereinafter, described with reference to FIGS. 16 to 18. For the sake of explanation, assume that a graphic has been entered at the time of starting processing.

The control processor 240 takes out the data on the appointed polygon from the document buffer 216 of the memory 212, and stores it into the working area 218 (Step 1701). Next, the control processor 240 takes out the both coordinates data of a first vertex P[1] and the next vertex P[2] from the data on the appointed graphic stored in the working area 218, and computes the length of a segment connecting P[1] and P[2] as the length of one side "edge" of a regular polygon to be processed (hereinafter, referred to as an "objective regular polygon"). As indicated in FIG. 16, the control processor 240 computes the angle "base" formed by the segment connecting the vertices P[1] and P[2] and a prescribed coordinate axis, for example, an X-axis (Step 1702). The vertex number i in the vertex P[i] of the objective regular polygon, which is the vertex to be sought newly, is initialized to 3 (Step 1703).

Next, the control processor 240 judges whether the value shown by the vertex number i is the vertex number n or below of the normalization objective polygon (Step 1704). When the vertex number i is n or below, the processor 240 computes the angle "step" formed by the segment connecting the vertex P[i-1] and the vertex P[i] of the objective regular polygon, or the side of the order i-1 of the objective regular polygon, and an X-axis by the following formula (3) (Step 1705).

$$\text{Step}=((360°\times(i-2))/n)+\text{base} \qquad (3)$$

The control processor 240 shifts the vertex P[i−1] in the positive direction of the X-axis by the distance indicated by the side length "edge" obtained in Step 1702, so as to obtain a provisional vertex P[i]' (Steps 1706 and 1707).

The control processor 240 rotates the provisional vertex P[i]' by the angle "step" with P[i−1] fixed as a center, so that the vertex obtained after the rotation is fixed as P[i] (Step 1708). After the completion of Step 1708, the control processor 240 modifies the vertex number i by an increment of 1 (Step 1709), thereby to return to the judgment in Step 1704.

The process from Step 1705 to Step 1709 is repeated until when the vertex number i becomes more than the number of the vertices n in Step 1704. When the vertex number i becomes more than the number of the vertices n, the processing is stopped here and the arranged graphic is displayed (Step 1704).

This time, a graphic arrangement device according to the third example of the conventional arts disclosed in Japanese Patent Laid-Open No. 63-261481, "A Method of Recognizing Symmetry of Graphics in a Graphic Recognizing Device" will be described. The graphic arrangement device disclosed in the same is used in order to recognize a figure drawn by the mnemonic operation method and make up for the measurements not illustrated in the figure.

FIG. 19 is a block diagram showing a constitution of the graphic arrangement device disclosed in the same. Referring to FIG. 19, the graphic arrangement device according to the third example of the conventional arts comprises a graphic recognizing device 301, a proposed symmetry segment extracting unit 302, a vertical segment setting unit 303, an arithmetic unit 304, and a graphic information setting unit 305. The graphic recognizing device 301 comprises a readout processing unit 311, an image data storing unit 312, a vector processing unit 313, a vector sorting processing unit 314, a symbol recognition processing unit 315, a segment discrimination processing unit 316, a character recognition processing unit 317 and a recognition result storing unit 318.

FIG. 20 is a flow chart for use of describing a flow of processing in the graphic arrangement device according to the third example of the conventional arts. FIG. 21 is a view for use of describing a symmetry judging method of a shape line intersecting a center line in the graphic arrangement device according to the third example of the conventional arts. An operation of the graphic arrangement device will be, hereinafter, described with reference to FIGS. 19 to 21.

The graphic recognizing device 301 is initially arranged to perform the following processing. That is, a drawing 300 entered into the readout processing unit 311 is stored into the image data storing unit 312. The vector processing unit 313 performs a polygonal line approximation on the image data stored in the image data storing unit 312, converts it into vector data, and delivers the data to the vector sorting processing unit 314. The vector sorting processing unit 314 supplies the vector data sorted into one of symbol, character and segment, to the symbol recognition processing unit 315, the segment discrimination processing unit 316 and the character recognition processing unit 317 respectively. The segment discrimination processing unit 316 classifies the vector data showing the segments into a shape line, a center line and the like, to store the result into the recognition result storing unit 318. The symbol recognition processing unit 315 and the character recognition processing unit 317 recognize symbols and characters respectively, so to store the data into the recognition result storing unit 318 with attributes attached thereto according to the result.

The proposed symmetry segment extracting unit 302 loads the data stored in the recognition result storing unit 318 (Step 2001), extracts the data on center lines having possibility of serving as symmetry axes, from the recognition result storing unit 318, so to compute the number of the center lines (Step 2002). As for each of the extracted center lines, the unit 302 checks whether there are any shape lines intersecting the center line, or any shape lines isolated from the center line at top and bottom or left and right of the center line (Step 2003).

At this time, when there is a center line intersecting a shape line, or an isolated shape line at the both sides of a center line, the vertical segment setting unit 303 and the arithmetic unit 304 are used in order to recognize the shape line or the symmetry of the isolated state of the shape line (Steps 2004 and 2005).

A judging method of symmetric condition in the graphic arrangement device according to the third example of the conventional arts will be explained with reference to FIG. 21.

The vertical segment setting unit 303 draws a perpendicular L2, for example, from an endpoint P2 of a vector to the center line b. The arithmetic unit 304 requires the distance $l_2$ from the endpoint P2 to the center line b, and further requires the distance $m_2$ from the intersection X2 on the vector c to the center line b. The intersection X2 is a point where the extended perpendicular L2 comes across the vector c. The difference between the distance $l_2$ and $m_2$ is calculated, so to check whether the relation between the difference and a constant threshold level (Δ½) satisfies the following formula (4). When the formula (4) is satisfied, similar calculation will be performed with respect to the other endpoints.

$$|l_2 - m_2| < \Delta \tfrac{1}{2} \qquad (4)$$

When the formula (4) is satisfied with respect to all the endpoints, and the relation between the total value of difference of each distance and the constant threshold level Q satisfies the following formula (5), the shape lines are judged to be symmetric with respect to the center line b.

$$\Sigma |l_n - m_n| < Q \qquad (5)$$

After the completion of symmetric judgment as for all the center lines, the graphic information setting unit 305 sets up the omitted graphic information on the basis of a part of the graphic information imparted to the symmetrical shape lines (Step 2007).

The above conventional graphic arrangement devices, however, have the following problems.

As a first problem, the graphic arrangement device according to the first example of the conventional arts is capable of creating nothing but a regular polygon. This is why this device cannot be applied to anything but a special figure like a regular polygon, because their input graphic parameters are the number of vertices and a radius of a circumscribed center.

As a second problem, the graphic arrangement device according to the first example of the conventional arts cannot create a regular polygon inclined to a reference (X-axis, Y-axis) determined externally. This is why the coordinates of each vertex are found by the use of an X-axis and a Y-axis as a reference, and the first vertex is located on the X-axis and Y-axis.

As a third problem, the graphic arrangement device according to the second example of the conventional arts transforms the figures such as a concave polygon and a polygon whose sides intersect together, into a regular polygon. This is why the device adopts an algorithm of making the polygons of any shape into a regular polygon.

As a fourth problem, the graphic arrangement device according to the third example of the conventional arts cannot arrange graphics in line symmetrical figures practically. This is why this device is originally used in order to judge the symmetric characteristic and make up for the measurement information. It does not aim to transform the shape of entered graphics.

As a fifth problem, the graphic arrangement device according to the third example of the conventional arts requires users to draw a graphic in consideration of a symmetry axis. This is why, of various kinds of lines, some kinds of lines are fixed as a center line and only the prescribed center lines are regarded as the symmetry axes.

SUMMARY OF THE INVENTION

A first object of the present invention is to provide a line symmetrical graphic arrangement device capable of creating a line symmetrical graphic with respect to any symmetry axes, independently of the number of axes, by requiring the symmetry axes, based on the shape of the input graphic and the characteristic of the symmetry axes, as for an input graphic judged to be approximately symmetrical with respect to some symmetry axes, and placing characteristic points of the input graphic with the obtained symmetry axes as reference, thereby to arrange the input graphic into a line symmetrical figure with respect to all the symmetry axes included in the input graphic.

A second object of the present invention is to provide a line symmetrical graphic arrangement device capable of arranging various general symmetrical graphics, by requiring symmetry axes based on the shape of the input graphic to arrange the graphic, in which device it doesn't matter whether the input graphic is a regular polygon or not.

A third object of the present invention is to provide a line symmetrical graphic arrangement device capable of processing input graphics of any shape, in which device an external reference like X-Y coordinates is not necessary and it doesn't matter whether an input graphic is inclined or not with respect to the coordinate axes in the process of graphic arrangement.

A fourth object of the present invention is to provide a line symmetrical graphic arrangement device capable of arranging into line symmetrical figures, according to the necessity, the graphics entered by users by means of handwriting without considering symmetric condition strictly, and reducing the users' trouble, by automatically judging symmetric condition as for the graphics entered by the users and arranging each graphic into a line symmetrical figure with respect to all the symmetry axes included in the corresponding graphic.

A fifth object of the present invention is to provide a line symmetrical graphic arrangement device capable of arranging graphics at more higher speed, by simultaneously locating two characteristic points in one pair which are located at the symmetrical positions with a symmetry axis fixed as a reference in order to arrange the graphics.

A sixth object of the present invention is to provide a line symmetrical graphic arrangement device capable of creating line symmetrical graphics in accordance with users' intention more exactly, by enabling users to specify a characteristic point serving as a reference for the graphic arrangement.

According to one aspect of the invention, a line symmetrical graphic arrangement device for arranging an input graphic into a line symmetrical figure with respect to a symmetry axis, comprises a characteristic quantity computing means for computing characteristic quantity depending on the input graphic and selecting characteristic points used for the graphic arrangement, a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means, a symmetry axis modifying means for modifying the proposed symmetry axes detected by said proposed symmetry axis detecting means according to the quality of the symmetry axes, to obtain the symmetry axes of the input graphic, and a characteristic point relocating means for relocating the characteristic points selected by said characteristic quantity computing means with the respective symmetry axes obtained by said symmetry axis modifying means as reference, so to create a symmetrical graphic with respect to the symmetry axes.

In the preferred construction, the proposed symmetry axis detecting means comprises a first proposed symmetry axis detecting means for detecting first proposed symmetry axes based on the characteristic of the shape and the quality of the symmetry axes in the input graphic which are specified by the characteristic quantity, and a symmetry judging means for judging whether the input graphic is approximately symmetrical with the respective first proposed symmetry axes detected by said first proposed symmetry axis detecting means as reference, and fixing the first proposed symmetry axes as second proposed symmetry axes to be processed by said symmetry axis modifying means when judging that the input graphic is approximately symmetrical.

In another preferred construction, the symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic.

In another preferred construction, the symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic, while the characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, the characteristic point position computing means includes the step of requiring the distance between a characteristic point of the characteristic point group and the base point about the symmetry axes, and the distance between the characteristic point and a symmetry axis located at the nearest position to the characteristic point, and the step of computing the positions of the other characteristic points by applying the relative position of the characteristic point specified by the two distances with respect to the symmetry axis, to the other characteristic points of the characteristic point group and the other symmetry axes.

Also, the symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic, while the characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, the characteristic point position computing means includes the step of requiring the distance between a characteristic point of the characteristic point group and the base point about the symmetry axes, and the distance between the characteristic point and a symmetry axis located at the nearest position to the characteristic point, the step of locating the other characteristic point which is located at the nearest position, to the symmetrical position of the characteristic point with respect to the symmetry axis when the characteristic point is not located on the symmetry axis, and repeats the above step of requiring the position of a characteristic point and the above step of locating the other characteristic point to the symmetrical position of the computed characteristic point, with respect to all the characteristic points of the characteristic point group.

In the above-mentioned construction, the symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic, while the characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, the characteristic point position computing means includes the step of, with respect to a characteristic point specified by a user from the characteristic point group, requiring the distance between the characteristic point and the base point about the symmetry axes, and the distance between the characteristic point and a symmetry axis located at the nearest position to the characteristic point, and the step of computing the positions of the other characteristic points by applying the relative position of the characteristic point specified by the two distances with respect to the symmetry axis, to the other characteristic points of the characteristic point group and the other symmetry axes.

Preferably, the symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic, while the characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, the characteristic point position computing means includes the step of, with respect to a characteristic point specified by a user from the characteristic point group, requiring the distance between the characteristic point and the base point about the symmetry axes, and the distance between the characteristic point and a symmetry axis located at the nearest position to the characteristic point, the step of locating the other characteristic point which is located at the nearest position, to the symmetrical position of the characteristic point with respect to the symmetry axis, when the characteristic point is not located on the symmetry axis, and the step of computing the positions of the other characteristic points by applying the relative position of the characteristic point specified by the two distances with respect to the symmetry axis, to the other characteristic points of the characteristic point group and the other symmetry axes, and repeats the above step of locating the other characteristic point to the symmetrical position of the computed characteristic point, with respect to all the characteristic points of the characteristic point group.

In the preferred construction, the proposed symmetry axis detecting means comprises a first proposed symmetry axis detecting means for detecting first proposed symmetry axes based on the characteristic of the shape and the quality of the symmetry axes in the input graphic which are specified by the characteristic quantity, and a symmetry judging means for judging whether the input graphic is approximately symmetrical with the respective first proposed symmetry axes detected by said first proposed symmetry axis detecting means as reference, and fixing the first proposed symmetry axes as second proposed symmetry axes to be processed by said symmetry axis modifying means when judging that the input graphic is approximately symmetrical, while the symmetry axis modifying means comprises a base point computing means for computing base points with reference to the second proposed symmetry axes detected by said proposed symmetry axis detecting means, the base points being fixed about the proposed symmetry axes by the intersections thereof when there are a plurality of the second proposed symmetry axes, and more particularly, the base points being fixed about the proposed symmetry axes by a center of a circumscribed graphic including the intersections thereof when there are a plurality of intersections of the second proposed symmetry axes, or there exists only one second proposed symmetry axis, and an axis angle deciding means for modifying the angle formed by the adjacent second proposed symmetry axes so that the second proposed symmetry axes are relocated at the same angle around the base point obtained by said base point computing means, thereby to decide the symmetry axes of the input graphic, while the characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, the characteristic point position computing means includes the step of, with respect to a characteristic point specified by a user from the characteristic point group, requiring the distance between the characteristic point and the base point about the symmetry axes, and the distance between the characteristic point and a symmetry axis located at the nearest position to the characteristic point, the step of locating the other characteristic point which is located at the nearest position, to the symmetrical position of the characteristic point with respect to the symmetry axis, when the characteristic point is not located on the symmetry axis, and the step of computing the positions of the other characteristic points by applying the relative position of the characteristic point specified by the two distances with respect to the symmetry axis, to the other characteristic points of the characteristic point group and the other symmetry axes, and repeats the above step of locating the other characteristic point to the symmetrical position of the computed characteristic point, with respect to all the characteristic points of the characteristic point group.

Other objects, features and effects of the present invention will be apparent from the following detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is a block diagram showing a constitution of a line symmetrical graphic arrangement device according to a second embodiment of the present invention.

FIGS. 15(A) and (B) are views showing a range of a vertex of a regular polygon computed by the first example of the conventional arts.

DESCRIPTION OF THE PREFERRED EMBODIMENT

A preferred embodiment of the present invention will be described in detail with reference to the accompanying drawings.

Figure 1:
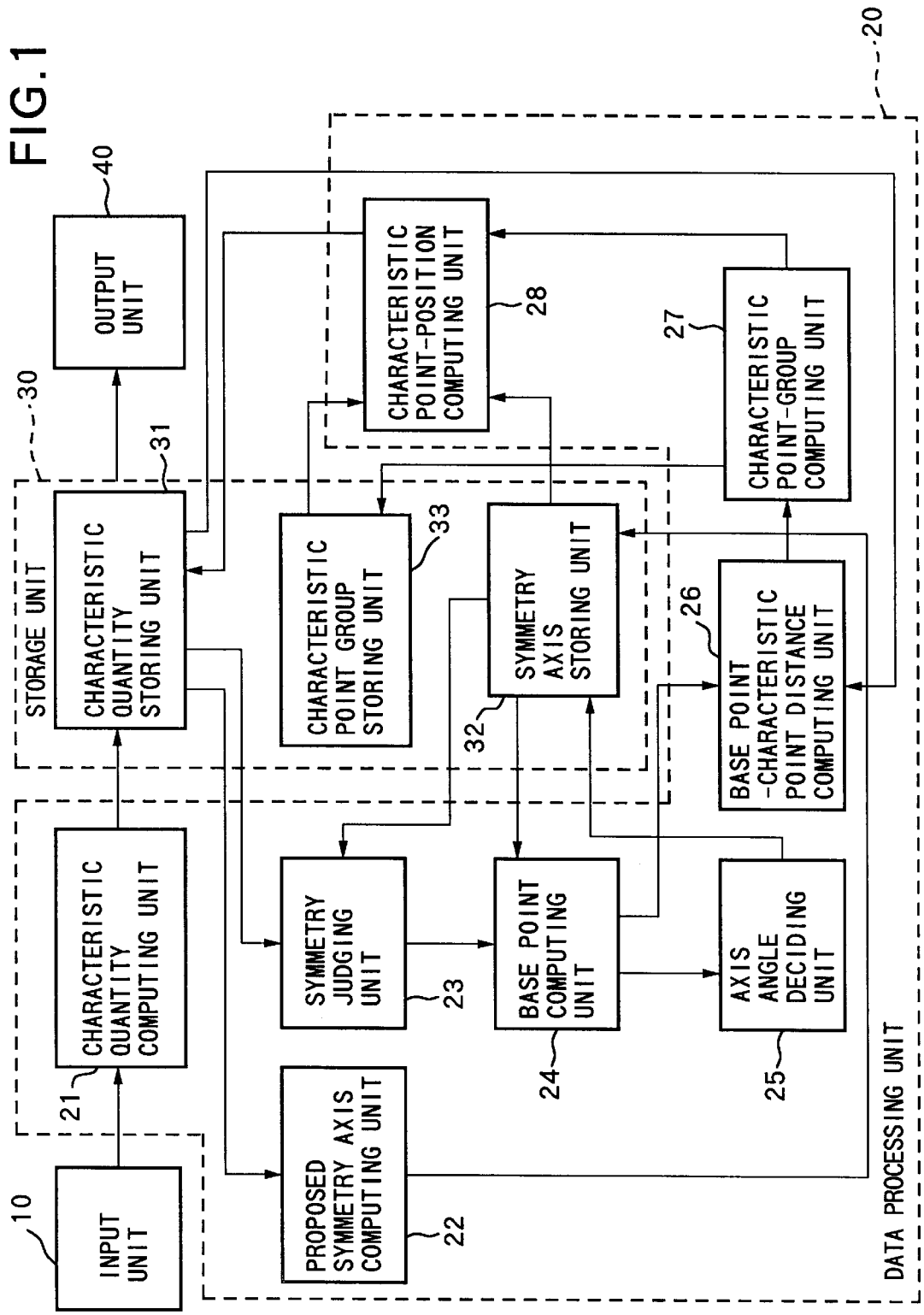
FIG. 1 is a block diagram showing a constitution of a line symmetrical graphic arrangement device according to a first embodiment of the present invention.

FIG. 1 is a block diagram for use of describing a constitution of a line symmetrical graphic arrangement device according to a first embodiment of the present invention.

Referring to FIG. 1, the line symmetrical graphic arrangement device according to the first embodiment comprises an input unit 10 for entering graphics, a data processing unit 20 executing various processing for creating line symmetrical graphics, a storing unit 30 for storing information obtained by the data processing device and an output unit 40 for displaying graphics to be processed and graphics having been processed.

The input unit 10 is realized by input devices such as a keyboard, a mouse, a pen tablet, a scanner and the like, so as to enter the graphics to be processed.

The data processing unit 20 is realized by a CPU controlled by a program. The unit 20 comprises a characteristic quantity computing unit 21 for computing characteristic quantity for seeking symmetry axes in an input graphic, a proposed symmetry axis computing unit 22 for computing proposed symmetry axes on the basis of the characteristic quantity computed by the characteristic quantity computing unit 21, a symmetry judging unit 23 for judging the presence of symmetric condition in an input graphic with respect to the proposed symmetry axes computed by the proposed symmetry axis computing unit 22, a base point computing unit 24 for arranging an input graphic into a line symmetrical figure with respect to symmetry axes according to the result by the symmetry judging unit 23, an axis angle deciding unit 25, a unit 26 of computing the distance between a base point and a characteristic point, a characteristic points-group computing unit 27 and a characteristic point-position computing unit 28.

The characteristic quantity computing unit 21 computes, in an input graphic, characteristic quantity characterizing the graphic such as coordinates of vertices, length and angle of a side, type of a line (straight or curved), center coordinates of an arc, length of a radius of an arc and the like. The computed characteristic quantity is stored into a characteristic quantity storing unit 31 of a storage unit 30 as described below. In the characteristic quantity computing unit 21, characteristic quantity shown by the coordinate values such as the coordinates of vertices and the coordinates of a center of an arc is regarded as a characteristic point. More specifically, in the polygons as shown in FIGS. 3(A) and (B), vertices are regarded as characteristic points, and in the graphics composed of curves as shown in FIGS. 3(C) and (D), centers and endpoints of the arcs are regarded as characteristic points.

The proposed symmetry axis computing unit 22 computes a plurality of proposed symmetry axes for use of judging symmetric condition in an input graphic. More specifically, each proposed symmetry axis is obtained by the respective combination of a characteristic point and a medial point of a side where a symmetry axis may pass, with reference to the coordinates of characteristic points stored in the characteristic quantity storing unit 31. The proposed symmetry axes computed at this stage is referred to as the first proposed symmetry axes.

Figure 3A:
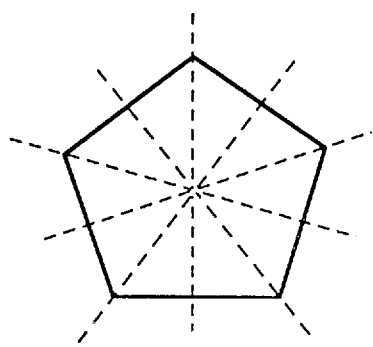
FIG. 3(A) is a view showing characteristic quantity and proposed symmetry axes computed in an input graphic, and particularly showing characteristic points and proposed symmetry axes of a straight lined graphic in which the number of vertices are odd.
Figure 3B:
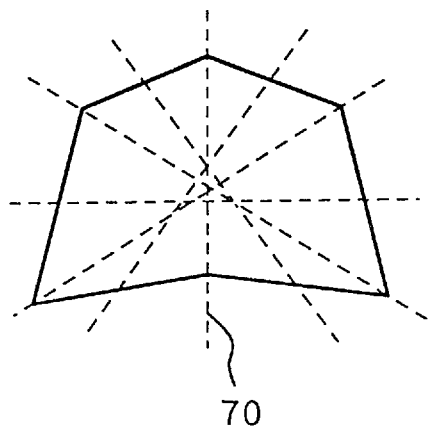
FIG. 3(B) is a view showing characteristic quantity and proposed symmetry axes computed in an input graphic, and particularly showing characteristic points and proposed symmetry axes of a straight-lined graphic in which the number of vertices are even.
Figure 3C:
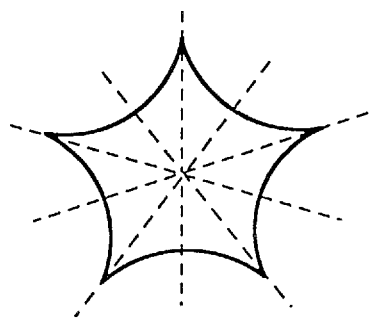
FIG. 3(C) is a view showing characteristic quantity and proposed symmetry axes computed in an input graphic, and particularly showing characteristic points and proposed symmetry axes of a curved-lined graphic in which the number of curved lines is odd.
Figure 3D:
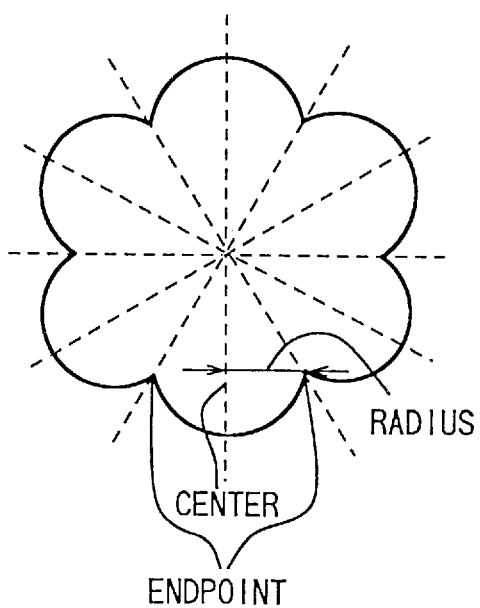
FIG. 3(D) is a view showing characteristic quantity and proposed symmetry axes computed in an input graphic, and particularly showing characteristic points and proposed symmetry axes of a curved-lined graphic in which the number of curved lines is even.

For example, in the polygon where the number of vertex is odd like a pentagon as shown in FIG. 3(A), the first proposed symmetry axes are lines connecting the respective vertices and medial points of their opposite sides. In the polygon where the number of vertex is even like a hexagon as shown in FIG. 3(B), the first proposed symmetry axes are lines connecting the facing vertex and lines connecting the medial points of the facing sides. In the curved-lined graphics where the number of vertex is odd as shown in FIG. 3(C), the first proposed symmetry axes are lines connecting the respective endpoints of the arcs and the respective centers of the opposite arcs. In the curved-lined graphics where the number of vertex is even as shown in FIG. 3(D), the first proposed symmetry axes are lines connecting the endpoints of the facing arcs and lines connecting the centers of the facing arcs. In the examples of these drawings, axes indicated in a broken line are the first proposed symmetry axes.

As described above, the first proposed symmetry axes are axes selected depending on the characteristic of a line symmetrical graphic. At this point, the first proposed symmetry axes cannot be decided as the symmetry axes, and there are no telling whether the input graphic is symmetric with respect to the first proposed symmetry axes. The information on the first proposed symmetry axes computed by the proposed symmetry axis computing unit 22 is stored in the symmetry axis storing unit 32 of the storage unit 30 as described below.

The symmetry judging unit 23 judges the presence of approximate symmetric condition in an input graphic with respect to the respective first proposed symmetry axes computed by the proposed symmetry axis computing unit 22. The presence of approximate symmetric condition means that the difference between the input graphic and the graphic to be symmetric with respect to a first proposed symmetry axis is a predetermined threshold level or under. The judgment by the symmetry judging unit 23 can be performed by the use of the conventional well-known art which checks the presence of symmetric condition with respect to a symmetry axis in a graphic. As one example of the conventional well-known art, the graphic arrangement device disclosed in Japanese Patent Laid-Open No. 63-261481, "A Method of Recognizing Symmetry of Graphics in a Graphic Recognizing Device" as mentioned above can be used. When the symmetry judging unit 23 judges that the input graphic is approximately symmetric with respect to some first proposed symmetry axes, the same proposed symmetry axes are referred to as second proposed symmetry axes. To take examples of FIG. 3, all of the first proposed symmetry axes are extracted as the second proposed symmetry axes in the respective graphics of FIGS. 3(A), (C) and (D), and in the graphic of FIG. 3(B), only the first proposed symmetry axis 70 is extracted as the second proposed symmetry axis.

Figure 4:
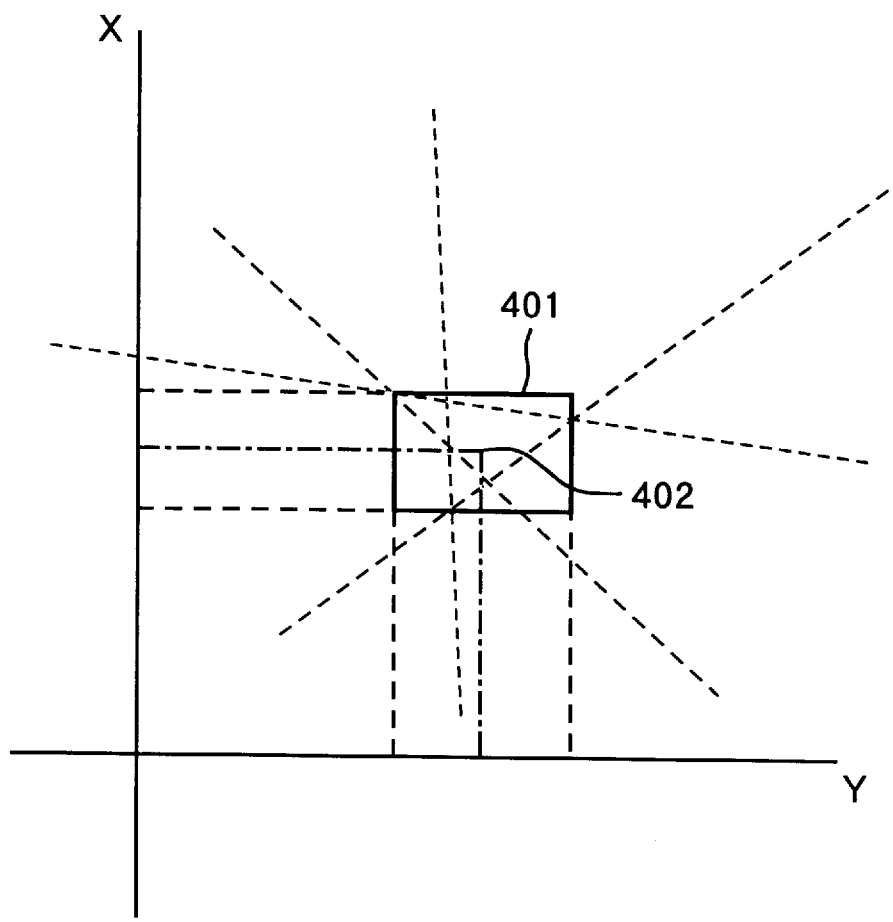
FIG. 4 is a view showing an example of a circumscribed rectangle.

The base point computing unit 24 computes a base point for use of arranging a graphic with respect to the second proposed symmetry axes extracted by the symmetry judging unit 23. A base point about the second proposed symmetry axes will be computed as follows. When there are a plurality of second proposed symmetry axes, an intersection of the respective second proposed symmetry axes is computed. At this time, all the second proposed symmetry axes do not converge on one point, but there exist a plurality of intersections in many cases. Therefore, some second proposed symmetry axes having intersections existing at the substantially same position, or having mutually adjacent intersections are selected to form a circumscribed rectangle inclusive these intersections of the second proposed symmetry axes, and a center of the circumscribed rectangle is computed, which center is defined as a base point. A circumscribed rectangle means a rectangle formed by the intersections of the maximum value on the X-coordinate, the minimum value on the X-coordinate, the maximum value on the Y-coordinate and the minimum value on the Y-coordinate, of all the intersections of the second proposed symmetry axes on the X-Y coordinates, by way of example as shown in FIG. 4. In FIG. 4, the point 402, a center point of the circumscribed rectangle 401 is a base point about the second proposed symmetry axes. In the pursuit of a base point about the second proposed symmetry axes, various methods such as requiring a base point by the use of a center of a circumscribed center can be adopted other than the method of requiring a base point by the use of a center of a circumscribed rectangle.

In the case where there exists only a second proposed symmetry axis like a graphic of FIG. 3(B), there exist no intersections of the second proposed symmetry axes. Therefore, a medial point on the second proposed symmetry axis is defined as a base point.

The axis angle deciding unit 25 arranges each angle of the second proposed symmetry axes used for computing a base point about the second proposed symmetry axes by the base point computing unit 24, so as to fix the second proposed symmetry axes as the symmetry axes. More specifically, each angle formed by the adjacent second proposed symmetry axes is decided so that the second proposed symmetry axes may be located at the same angle around the base point, and these second proposed symmetry axes are defined as the symmetry axes. Namely, when the number of the second proposed symmetry axes used for computing a base point is n, an angle formed by the adjacent symmetry axes is $(180/n)°$. The information on these created symmetry axes is stored in the symmetry axis storing unit 32 of the storage unit 30 as described below.

The base point-characteristic point distance computing unit 26 computes the distance between a center of the symmetry axis as the base point computed by the base point computing unit 24 and each characteristic point.

The characteristic group computing unit 27 creates a characteristic group by gathering characteristic points where the difference of the distance computed by the base point-characteristic point distance computing unit 26 is a predetermined threshold level or under. At this time, a group of characteristic points includes the number of integral times of the number of symmetry axes. The combination of characteristic points included in each created group of characteristic points is stored in the characteristic points group storing unit 33 of the storage unit 30 as described below.

The characteristic point-position computing unit 28 computes the relative position of all the characteristic points belonging to each characteristic group computed by the characteristic points-group computing unit 27 with respect to the symmetry axes whose angle has been decided by the axis angle deciding unit 25. More specifically, the following processing will be performed on each group of characteristic points.

Figure 5:
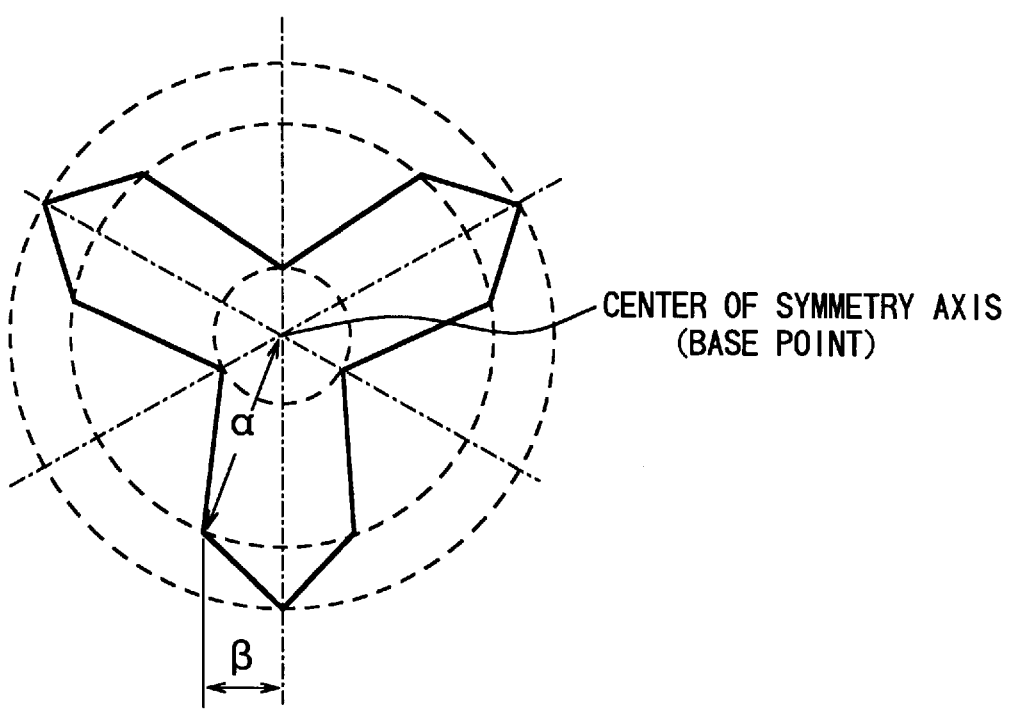
FIG. 5 is a view showing an example of a graphic with the graphic arrangement performed thereon.

To take an example of a graphic shown in FIG. 5, one of any characteristic points of a characteristic point group is selected, to compute the distance "α" between the selected characteristic point and a base point on the symmetry axis (the same as a base point on the second proposed symmetry axes). The distance "β" between the selected characteristic point and the symmetry axis at the shortest distance from the same characteristic point is computed. When the number of characteristic points in the characteristic point group is similar to the number of the symmetry axes, the characteristic points are located on the symmetry axis, with the result that β becomes 0 (β=0).

Next, the rests of characteristic points of the characteristic point group are relocated to the position at the distance "α" from the center of the symmetry axis and at the distance "β" from the symmetry axis positioned at the shortest distance from each characteristic point. New coordinates of each characteristic point are stored in the characteristic quantity storing unit 31 of the storage unit 30.

Owing to the above processing, the respective characteristic points are located on the concentric circle having the characteristic point group located there, at the symmetrical positions with respect to the shortest symmetry axis.

The storage unit 30 is realized by a memory such as a RAM and a storage such as a magnetic disk storage. The unit 30 comprises the characteristic quantity storing unit 31 which stores the characteristic quantity computed by the characteristic quantity computing unit 21, the symmetry axis storing unit 32 which stores the first symmetry axes computed by the proposed symmetry axis computing unit 22 and the data on the symmetry axes relocated by the axis angle deciding unit 25, and the characteristic point group storing unit 33 which stores the combination of characteristic point group computed by the characteristic point group computing unit 27.

An output unit 40 is realized by a display or the like, so as to display input graphics and arranged graphics. The output unit 40 may be arranged to display the graphics to be processed at any time during the processing by the data processing unit 20, so as to enable users to proceed the processing while confirming the result thereof.

An operation of the first embodiment having the above constitution will be described with reference to the flow chart of FIG. 2.

The input unit 10 enters a graphic (Step 201), when the characteristic quantity computing unit 21 computes the characteristic quantity in the input graphic, and stores the data into the characteristic quantity storing unit 31. At this time, the characteristic quantity having coordinate values of the vertex or the center of the arc is defined as a characteristic point (Step 202).

The proposed symmetry axis computing unit 22 requires the first proposed symmetry axes by combining the respective characteristic points and medical points on sides in pairs where the symmetry axis may pass, with reference to the coordinates of the characteristic points stored in the characteristic quantity storing unit 31 (Step 203).

The symmetry judging unit 23 judges the presence of an approximate symmetry in the input graphic with respect to each of the first proposed symmetry axes computed by the proposed symmetry axis computing unit 22, thereby to select the second proposed symmetry axes (Step 204).

The base point computing unit 24 computes the intersections of the second proposed symmetry axes selected by the symmetry judging unit 23. Of the computed intersections, the second proposed symmetry axes having intersections existing at the substantially same position are selected, thereby computing a base point over the second proposed symmetry axes (Step 205). The axis angle deciding unit 25 decides the angle of the second proposed symmetry axes selected by the base point computing unit 24, thereby defining the second proposed symmetry axes as the symmetry axes. The information on the created symmetry axes is stored into the symmetry axis storing unit 32.

The base point-characteristic point distance computing unit 26 computes the distance between each characteristic point and the center of the symmetry axis (base point) (Step 206). The characteristic point group computing unit 27 makes a characteristic point group by gathering the characteristic points respectively having the distance of substantially like value computed by the base point-characteristic point distance computing unit 26 (Step 207).

The characteristic point-position computing unit 28 will conduct the following processing with respect to each characteristic point group. First of all, one characteristic point is selected from a characteristic point group, and with respect to the selected characteristic point, the unit 28 computes the distance "α" between the same and the base point, and the distance "β" between the same and the symmetry axis located at the shortest distance from the characteristic point, (Steps 208 and 209).

On the basis of the computed distance "α" and "β", the characteristic point-position computing unit 28 computes the relative position of the other characteristic points belonging to the characteristic point group under processing, with respect to the respective symmetry axes, so as to locate the other characteristic points (Step 210).

The processing of the above steps 209 and 210 is repeated until the computation of the position has been finished regarding all the characteristic point groups, so as to display from the output unit 40, the graphic arranged into a line symmetrical figure with respect to all the symmetry axes finally obtained as the result of the processing.

FIG. 6 is a view for use of describing a concrete example of the processing by the line symmetrical graphic arrangement device according to the first embodiment.

Figure 6A:
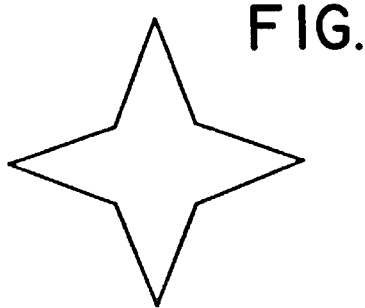
FIG. 6(A) is a view showing a process of performing graphic arrangement on an input graphic, and particularly showing the state when arrangement processing starts.

The concrete example of the processing by the line symmetrical graphic arrangement device will be, hereinafter, explained, taking an example in the case of entering the graphic indicated in FIG. 6(A).

Figure 6B:
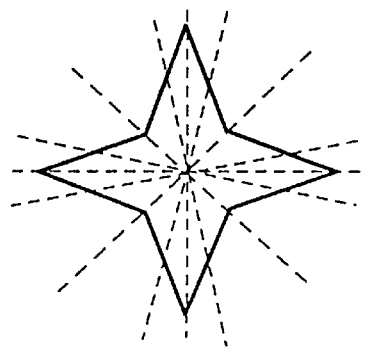
FIG. 6(B) is a view showing a process of performing graphic arrangement on an input graphic, and particularly showing the state when the first proposed symmetry axes are computed.

The proposed symmetry axis computing unit 22 computes first proposed symmetry axes in the input graphic from the characteristic points computed by the characteristic quantity computing unit 21. In the example of FIG. 6, eight first proposed symmetry axes are computed as indicated in FIG. 6(B).

The symmetry judging unit 23 judges the presence of symmetric condition in the input graphic with respect to each of eight first proposed symmetry axes computed in the above, thereby to extract second proposed symmetry axes. As a result, four axes of eight first proposed symmetry axes are judged to be the second proposed symmetry axes as indicated in FIG. 6(C).

Figure 6C:
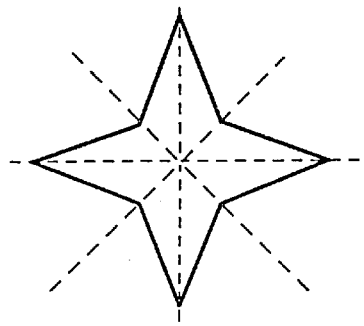
FIG. 6(C) is a view showing a process of performing graphic arrangement on an input graphic, and particularly showing the state when the second proposed symmetry axes are decided.
Figure 6D:
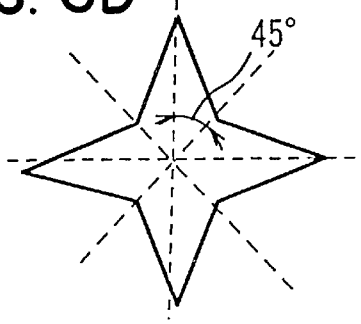
FIG. 6(D) is a view showing a process of performing graphic arrangement on an input graphic, and particularly showing the state when the direction of symmetry axes are adjusted.

As shown in FIG. 6(C), the intersections of the four second proposed symmetry axes are substantially coincident together at the same position. The base point computing unit 24 computes the coordinates of the center of a circumscribed rectangle formed by the intersections of the second proposed symmetry axes, thereby to define the coordinate point as a base point about the second proposed symmetry axes. The axis angle deciding unit 25 modifies the angle made by the adjacent symmetry axes to 450 according to the expression $$180°/4=45°$$

because the number of the second proposed symmetry axes is four (refer to FIG. 6(D)).

Figure 6E:
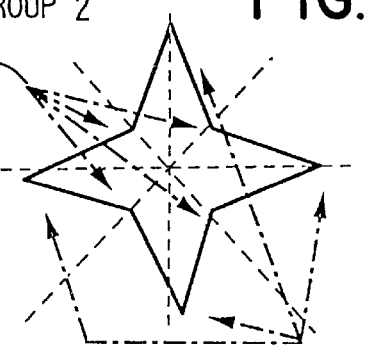
FIG. 6(E) is a view showing a process of performing graphic arrangement on an input graphic, and particularly showing the state when characteristic point group are found.
Figure 6F:
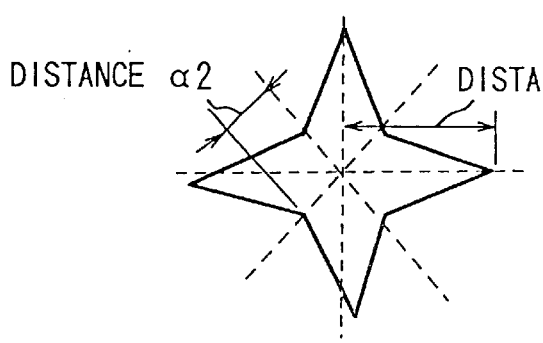
FIG. 6(F) is a view showing a process of performing graphic arrangement on an input graphic, and particularly showing the condition for relocating the characteristic points.
Figure 6G:
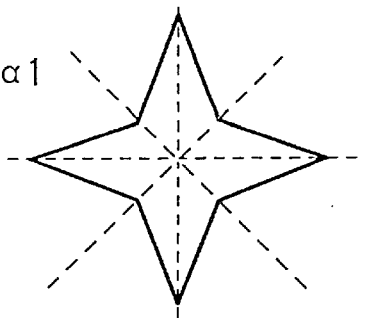
FIG. 6(G) is a view showing a process of performing graphic arrangement on an input graphic, and particularly showing the state when the graphic arrangement has been completed.

This time, the base point-characteristic point distance computing unit 26 computes the respective distance between all the characteristic points and a base point, and classifies all the characteristic points into a characteristic point group 1 and a characteristic point group 2 as indicated in FIG. 6(E).

The characteristic point-position computing unit 28 fixes the distance between one point of the characteristic point group 1 and the center of the symmetry axes as the distance "α1". In the example of FIG. 6, the number of the characteristic points included in the characteristic point group 1 is four similarly to the number of the symmetry axes, thereby locating the characteristic point on the symmetry axis. The rest three points of the characteristic point group 1 are located on the symmetry axes in the same way. As for the characteristic point group 2, the distance "α2" between one point of the computed characteristic point group 2 and the center of the symmetry axes is used so as to locate the characteristic point on the symmetry axis similarly (refer to FIG. 6(F)). Finally, the arranged graphic is displayed by the output unit 40 (refer to FIG. 6(G)).

The line symmetrical graphic arrangement device can be arranged to start the operation for the above graphic processing of the input graphic automatically at the time of recognizing that an input graphic is approximate to a line symmetrical figure by a proper means. Alternatively, the device can be arranged to start the operation by users' instruction to perform an arranging processing on an input graphic. When it is impossible to arrange an input graphic into a line symmetrical figure because the input graphic is distorted in case of performing the processing by users' instruction, for example, when none of the second proposed symmetry axes is detected, the output unit 40 or the like informs users that this arrangement instruction is impossible by displaying such thereon.

As described above, the line symmetrical graphic arrangement device according to the first embodiment is capable of arranging an input graphic into a line symmetrical figure with respect to any symmetry axes, with ease. Graphics to be processed by the device are not restricted to the shape of a regular polygon, but any graphics having line symmetrical characteristic will do. Therefore, a concave polygon and a polygon whose sides intersect can be arranged into a symmetrical figure. Since the symmetry axes can be detected on the basis of the shape of an input graphic, it is not necessary to pay attention to the symmetry axes in the input graphic upon entry of the graphic. Since the direction of the symmetry axes are specified on the basis of the shape of an input graphic, it is not necessary to take into consideration whether the input graphic is inclined or not to a reference such as X-Y axes.

Next, a second embodiment of the present invention will be described. FIG. 7 is a block diagram showing a constitution of a line symmetrical graphic arrangement device according to the second embodiment of the present invention.

Referring to FIG. 7, a line symmetrical graphic arrangement device according to the second embodiment comprises an input unit 10 for entering graphics, a data processing unit 50 executing various processing for creating line symmetrical graphics, a storage unit 30 for storing information obtained by the data processing unit and an output unit 40 displaying graphics to be processed and graphics having been processed. The data processing unit 50 is realized by a CPU controlled by a program. The unit 50 comprises a characteristic quantity computing unit 21 computing characteristic quantity for requiring the symmetry axes of the input graphic, a proposed symmetry axis computing unit 22 for computing proposed symmetry axes on the basis of the characteristic quantity computed by the characteristic quantity computing unit 21, a symmetry judging unit 23 for judging the presence of symmetric condition in an input graphic with respect to the proposed symmetry axes computed by the proposed symmetry axis computing unit 22, a base point computing unit 24 for arranging an input graphic into a line symmetrical figure with respect to a symmetry axis according to the result by the symmetry judging unit 23, an axis angle deciding unit 25, a unit 26 of computing the distance between a base point and a characteristic point, a characteristic point group computing unit 27, a characteristic point position computing unit 28 and a line symmetry position-characteristic point computing unit 29.

The above constitution of the second embodiment is similar to that of the first embodiment indicated in FIG. 1, except the symmetry position-characteristic point computing unit 29 included in the data processing unit 50 of the second embodiment. Therefore, the same reference numerals are attached to these common components, thereby omitting their description.

The symmetry position-characteristic point computing unit 29 computes the symmetrical position of a characteristic point with respect to a symmetry axis after obtaining the distance "α" from a base point to a characteristic point of the characteristic point group, and the distance "β" from the symmetry axis to the same characteristic point by the characteristic point position computing unit 28. Another symmetrical point located at the nearest position to the computed position is moved to the computed position. Namely, when the characteristic point position computing unit 28 computes the relative position of a characteristic point with respect to a symmetry axis, another characteristic point symmetrical to the characteristic point is automatically placed at the symmetrical position of the characteristic point.

The characteristic points not located on the symmetry axis are placed in pair at the symmetrical positions with respect to the nearest symmetry axis. Therefore, when the characteristic point group to be processed is not located on the symmetry axes, the position which is symmetrical to the position where a characteristic point has been located is computed, and another characteristic point is located at this computed position, thereby locating the characteristic points more efficiently.

This time, an operation of the second embodiment will be described with reference to a flow chart of FIG. 8.

Figure 2:
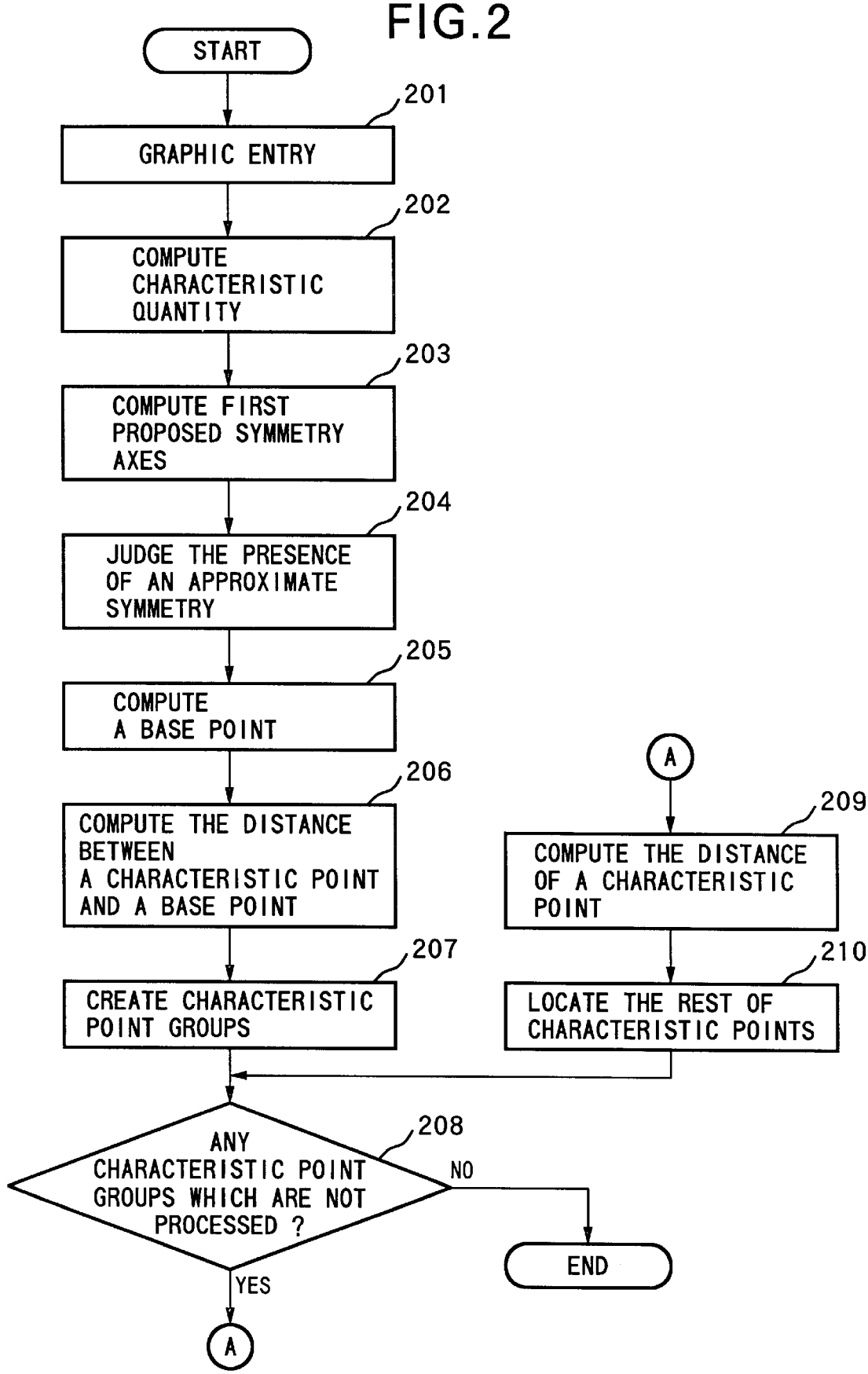
FIG. 2 is a flow chart showing an operation of the line symmetrical graphic arrangement device of the first embodiment.
Figure 8:
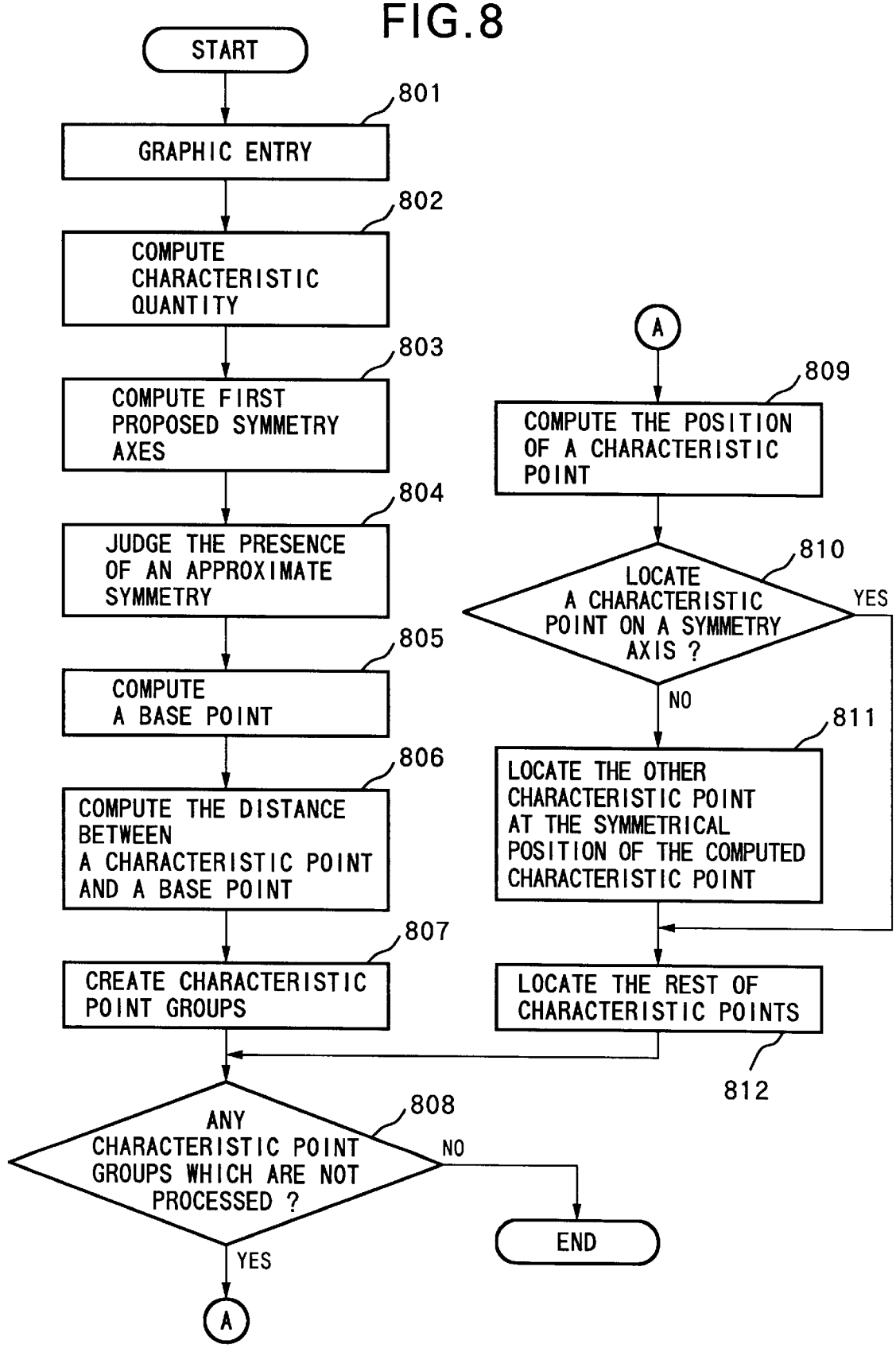
FIG. 8 is a flow chart showing an operation of the line symmetrical graphic arrangement device of the second embodiment.

As illustrated in FIG. 8, of the whole operation of the second embodiment, a sequential operation from start to the step of creating characteristic point groups by the characteristic point group computing unit 27 (Step 807), and the step of computing the relative position of a characteristic point of a characteristic point group with respect to a symmetry axis by the characteristic point-position computing unit 28 (Steps 808 and 809) is similar to the operation to Step 209 in the first embodiment as indicated in FIG. 2, thereby omitting the description thereof.

When the characteristic point-position computing unit 28 selects one characteristic point from a characteristic point group, and computes the distance "α" between the characteristic point and a base point, and the distance "β" between the characteristic point and the symmetry axis located at the nearest position to the characteristic point (Steps 808 and 809), the symmetry position-characteristic point computing unit 29 judges whether the characteristic point group is to be located on the symmetry axes. In the case where the characteristic point group should not be located on the symmetry axes, the unit 29 computes the symmetrical position of the selected characteristic point with respect to the symmetry axis, so as to place another symmetrical point which is located at the nearest position to the computed position, at the computed position (Steps 810 and 811). Similarly, as for the rest of the characteristic points of the characteristic point group, the unit 29 judges whether each of them is to be located on a symmetry axis, so that another characteristic point at the symmetrical position is automatically placed at the computed position when it should not be located on a symmetry axis.

As described above, according to the line symmetrical graphic arrangement device of the second embodiment, two characteristic points located symmetrically with respect to a symmetry axis are placed in pair, thereby to speed up processing, compared with the line symmetrical graphic arrangement device according to the first embodiment.

Figure 9:
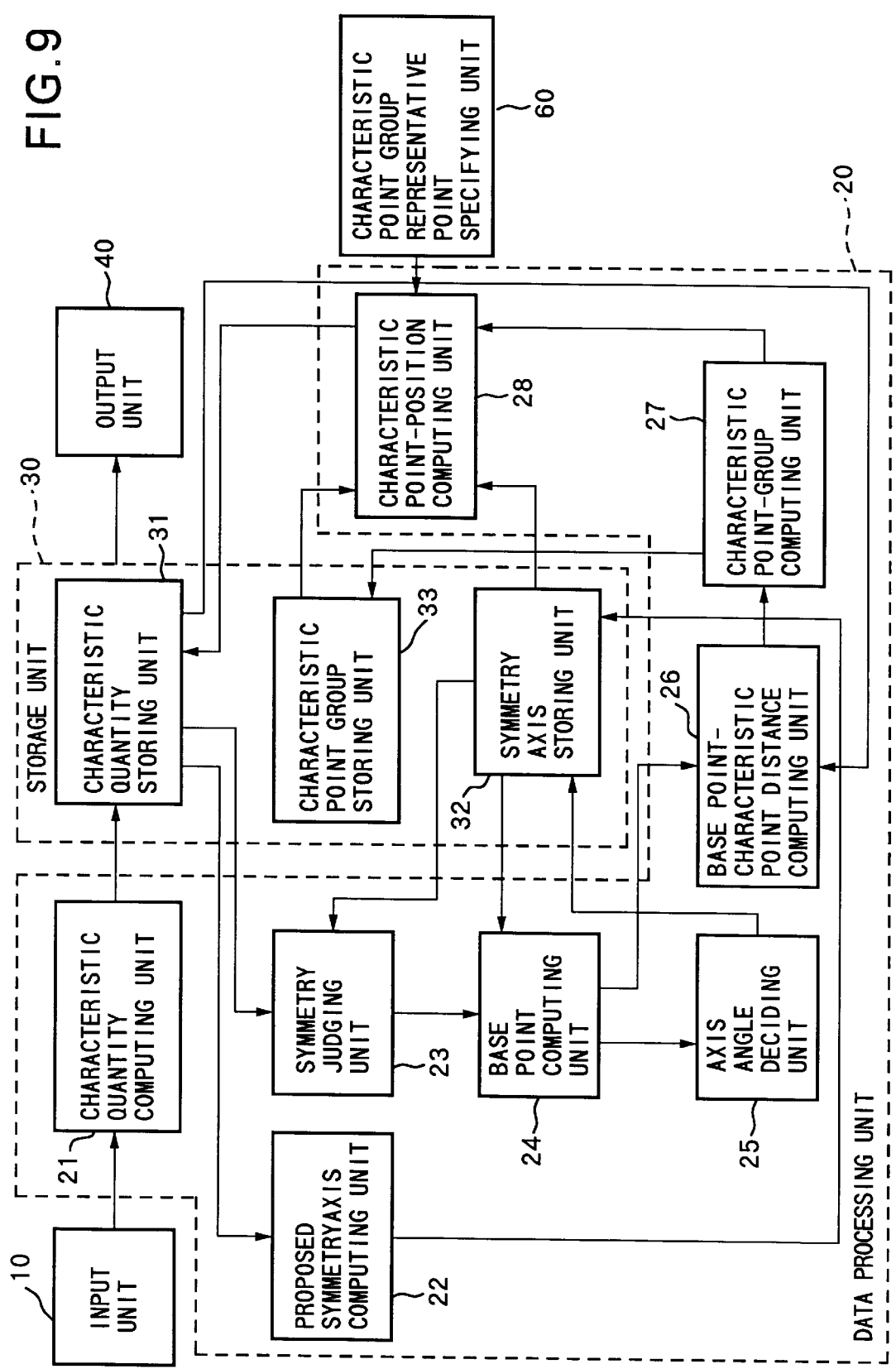
FIG. 9 is a block diagram showing a constitution of a line symmetrical graphic arrangement device according to a third embodiment of the present invention.

A third embodiment of the present invention will be described below. FIG. 9 is a block diagram showing a constitution of a line symmetrical graphic arrangement device according to the third embodiment of the present invention.

Referring to FIG. 9, the line symmetrical graphic arrangement device according to the third embodiment comprises an input unit 10 for entering graphics, a data processing unit 20 executing various processing for creating line symmetrical graphics, a storage unit 30 for storing information obtained by the data processing unit, an output unit 40 for displaying graphics to be processed and graphics having been processed and a characteristic point group representative point specifying unit 60 for enabling users to specify the shape of a line symmetrical graphic which is created by the data processing unit 20. Of the above components, the components of the input unit 10, the data processing unit 20, the storage unit 30 and the output unit 40 are similar to those of the first embodiment indicated in FIG. 1. Therefore, the same reference numerals are attached to these common components, thereby omitting their description.

The characteristic point group representative point specifying unit 60 is realized by an input device such as s keyboard, a mouse, a pen tablet or the like. As for a characteristic point of the characteristic point group created by the characteristic point computing unit 27, when the characteristic point-position computing unit 28 of the data processing unit 20 computes the relative position of the characteristic point with respect to a symmetry axis, the unit 60 is used in order to specify the characteristic point to be processed, from a characteristic point group. While referring to the graphic under processing which is displayed on the output unit 40, a user selects a desired characteristic point, and gives an instruction to compute the distance "α" from a base point to the selected characteristic point and the distance "β" from a symmetry axis to the same by the use of the characteristic point group representative specifying unit 60. As the method of selecting a characteristic point, for example, a characteristic point located at the upmost position on the screen of the display unit 40 can be selected from a characteristic point group, alternatively, a characteristic point located on the symmetry axis, or a characteristic point located at the nearest distance from the symmetry axis can be selected by priority.

An operation of the third embodiment will be explained with reference to the flow chart of FIG. 10.

Figure 10:
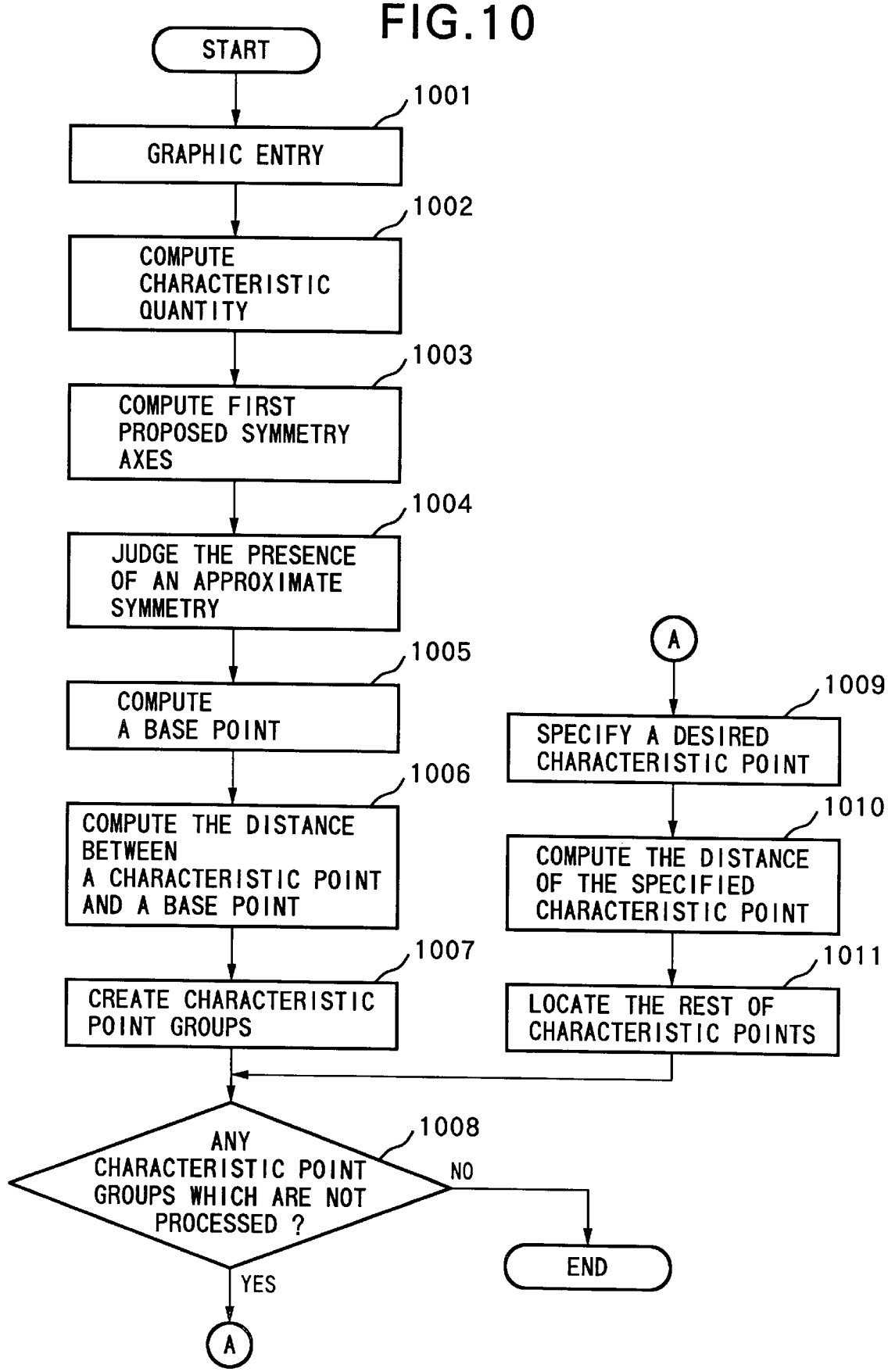
FIG. 10 is a flow chart showing an operation of the line symmetrical graphic arrangement device of the third embodiment.

As illustrated in FIG. 10, of the whole operation of the third embodiment, a sequential operation from start to the step of creating of a characteristic point group by the characteristic point group computing unit 27 (Step 1007) is similar to the operation to Step 207 in the first embodiment indicated in FIG. 2, thereby omitting the description thereof.

When the characteristic point group is created by the characteristic point group computing unit 27, a user specifies a characteristic point of which relative position with respect to the symmetry axis is first required by the use of the characteristic point group specifying unit 60 (Steps 1008 and 1009). The characteristic point position computing unit 28 computes the distance "α" between a base point and a characteristic point which is specified by the characteristic point group representative unit 60 from a characteristic point group, and the distance "β" between the characteristic point and a symmetry axis located at the nearest position to the characteristic point (Step 1010). The characteristic point position computing unit 28 computes the relative position of the other characteristic point with respect to the symmetry axis on the basis of the computed distance "α" and "β" so as to place the other characteristic point to the computed position (Step 1011).

As described above, the line symmetrical graphic arrangement device according to the third embodiment enables a user to specify a desired characteristic point as a first characteristic point for the use of computing the relative position of the same about a symmetry axis, from the characteristic point group, thereby to create a line symmetrical graphic serving the user's wishes more exactly.

Figure 11:
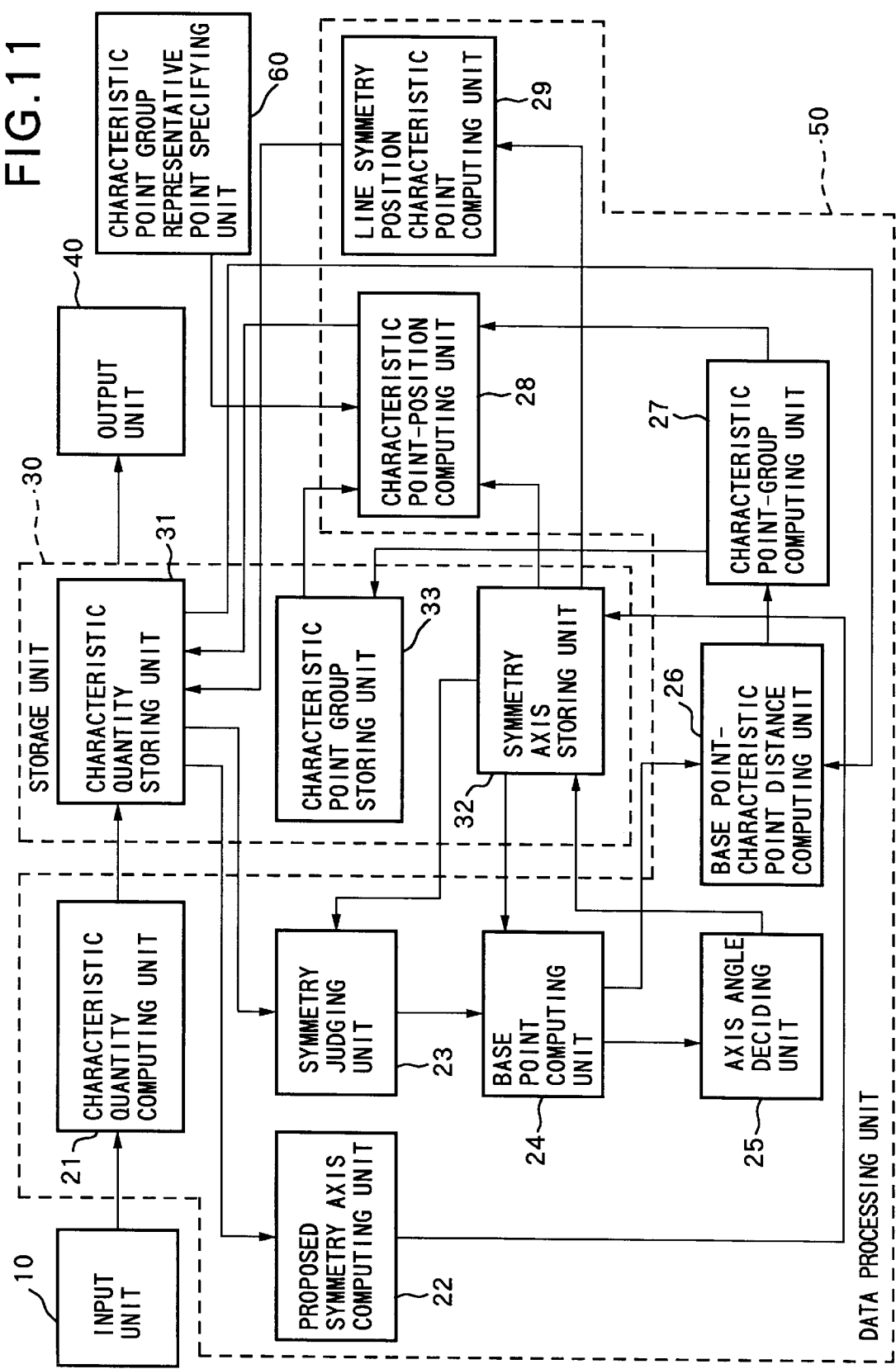
FIG. 11 is a block diagram showing a constitution of a line symmetrical graphic arrangement device according to a fourth embodiment of the present invention.

A fourth embodiment of the present invention will be explained below. FIG. 11 is a block diagram showing a constitution of a line symmetrical graphic arrangement device according to the fourth embodiment of the present invention.

Referring to FIG. 11, the line symmetrical graphic arrangement device according to the fourth embodiment comprises an input unit 10 for entering graphics, a data processing unit 50 executing various processing for creating line symmetrical graphics, a storage unit 30 for storing information obtained by the data processing unit, an output unit 40 for displaying graphics to be processed and graphics having been processed, and a characteristic point group representative point specifying unit 60 for allowing users to specify the shape of a line symmetrical graphic to be created by the data processing unit 20.

Of the above components, the input unit 10, the data processing unit 20, the storage unit 30 and the output unit 40 have the same constitution as those of the first embodiment indicated in FIG. 1, and the characteristic point group representative point specifying unit 60 has the same constitution as that of the third embodiment indicated in FIG. 9. The data processing unit 50 comprises a characteristic quantity computing unit 21, a proposed symmetry axis computing unit 22, a symmetry judging unit 23, a base point computing unit 24, an axis angle deciding unit 25, a unit 26 for computing the distance between a base point and a characteristic point, a characteristic point-group computing unit 27, a characteristic point position computing unit 28 and a symmetry position characteristic point computing unit 29, in the same constitution as the data processing unit 50 of the second embodiment indicated in FIG. 7.

An operation of the fourth embodiment will be explained with reference to the flow chart of FIG. 12.

Figure 12:
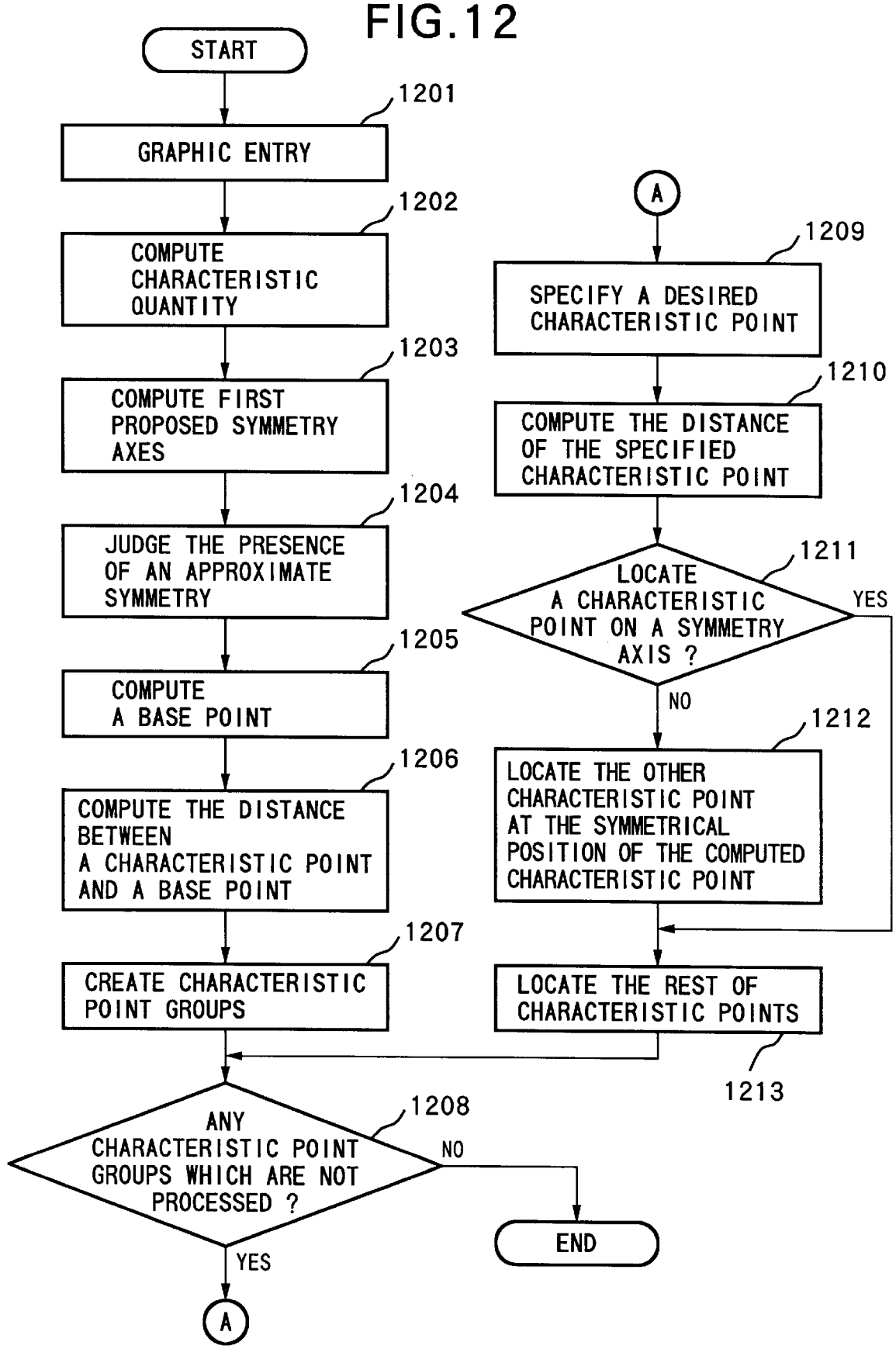
FIG. 12 is a flow chart showing an operation of the line symmetrical graphic arrangement device of the fourth embodiment.
Figure 13:
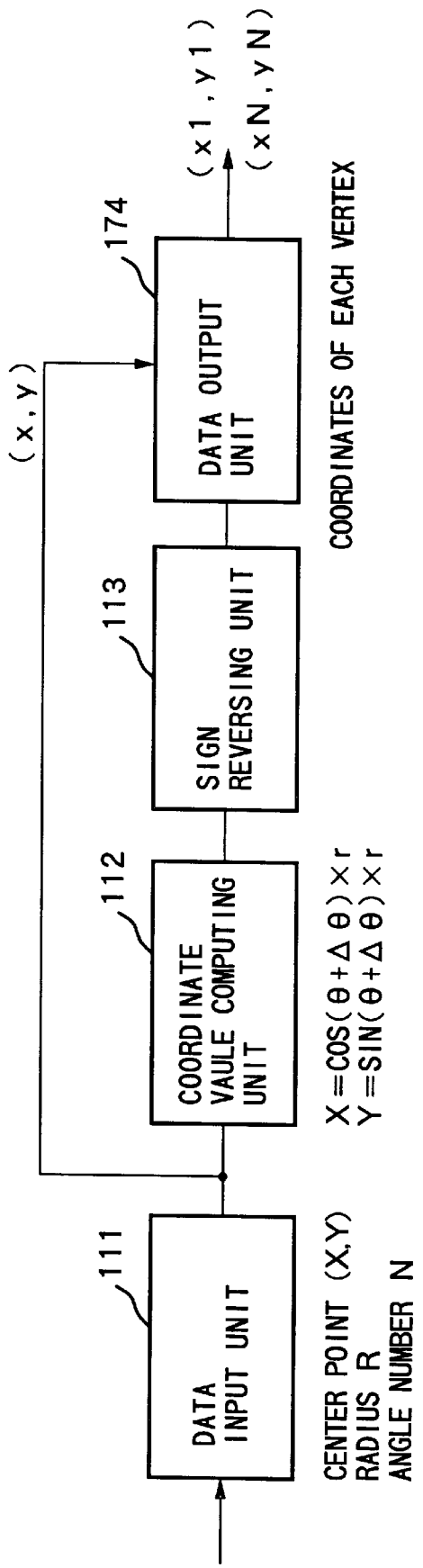
FIG. 13 is block diagram showing a constitution of a graphic arrangement device according to a first example of the conventional arts.
Figure 14:
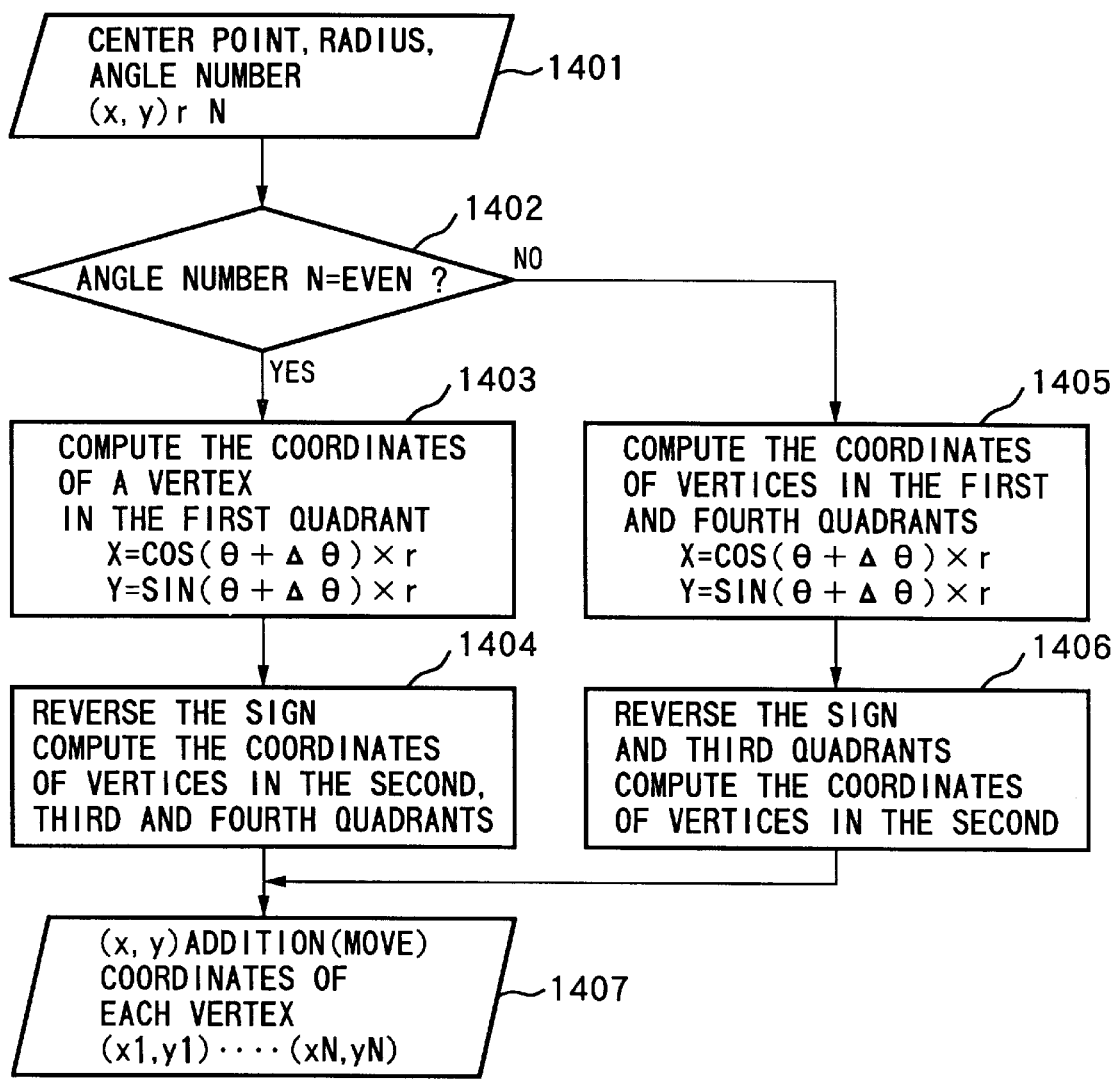
FIG. 14 is a flow chart showing an operation of the graphic arrangement device according to the first example of the conventional arts.
Figure 16:
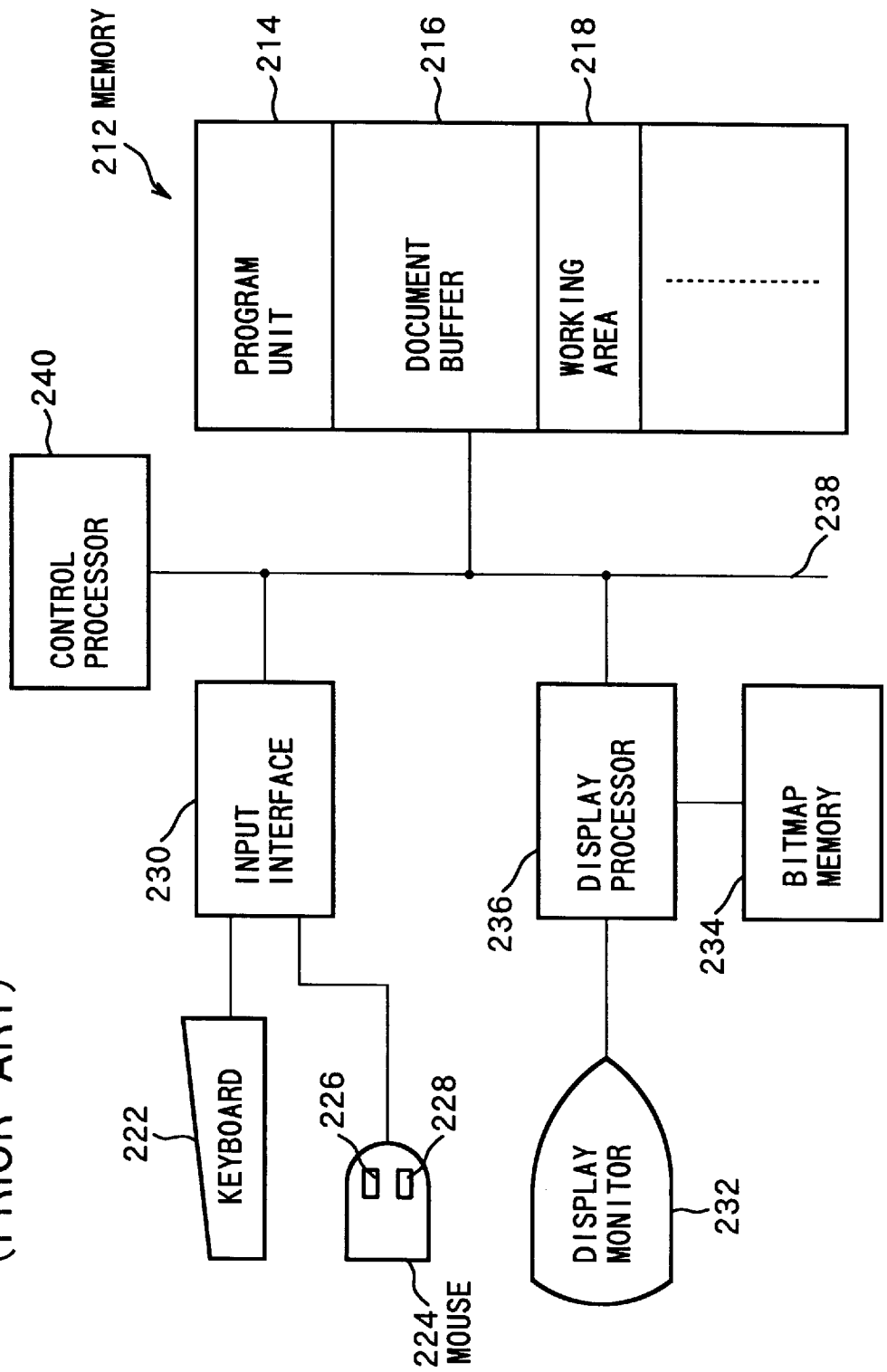
FIG. 16 is a block diagram showing a constitution of a graphic arrangement device according to a second example of the conventional arts.
Figure 17:
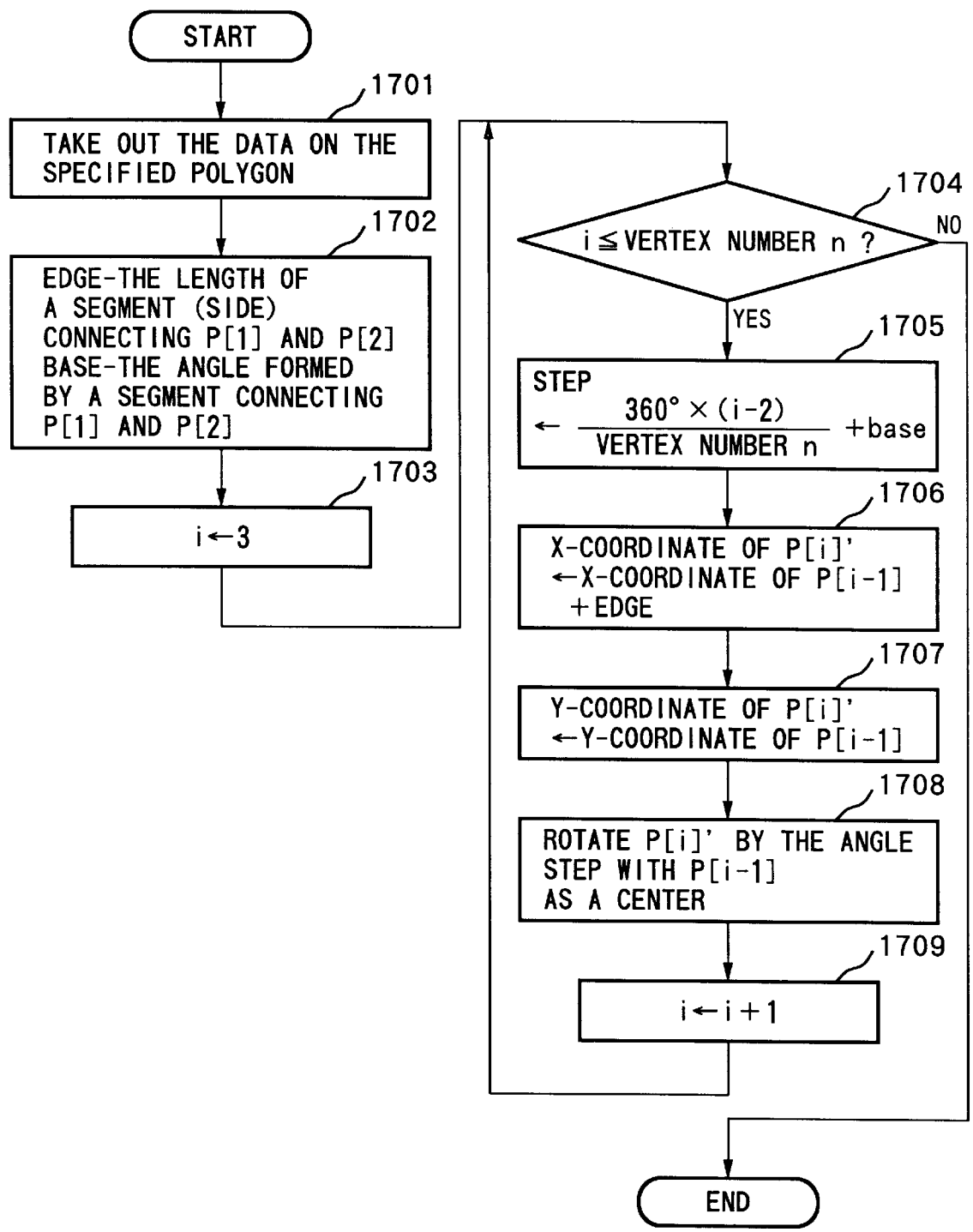
FIG. 17 is a flow chart showing an operation of the graphic arrangement device according to the second example of the conventional arts.
Figure 18:
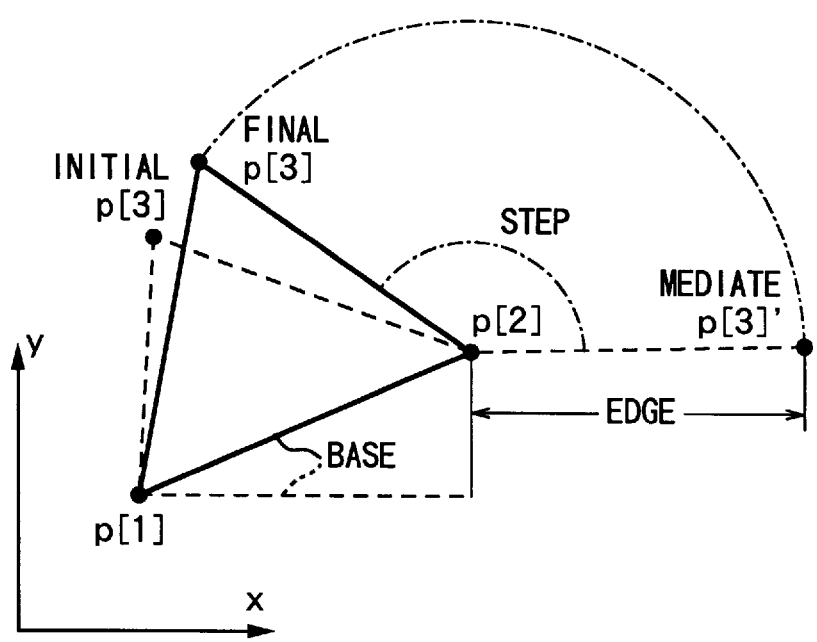
FIG. 18 is a view showing a processing of an operation by the graphic arrangement device according to the second example of the conventional arts.
Figure 19:
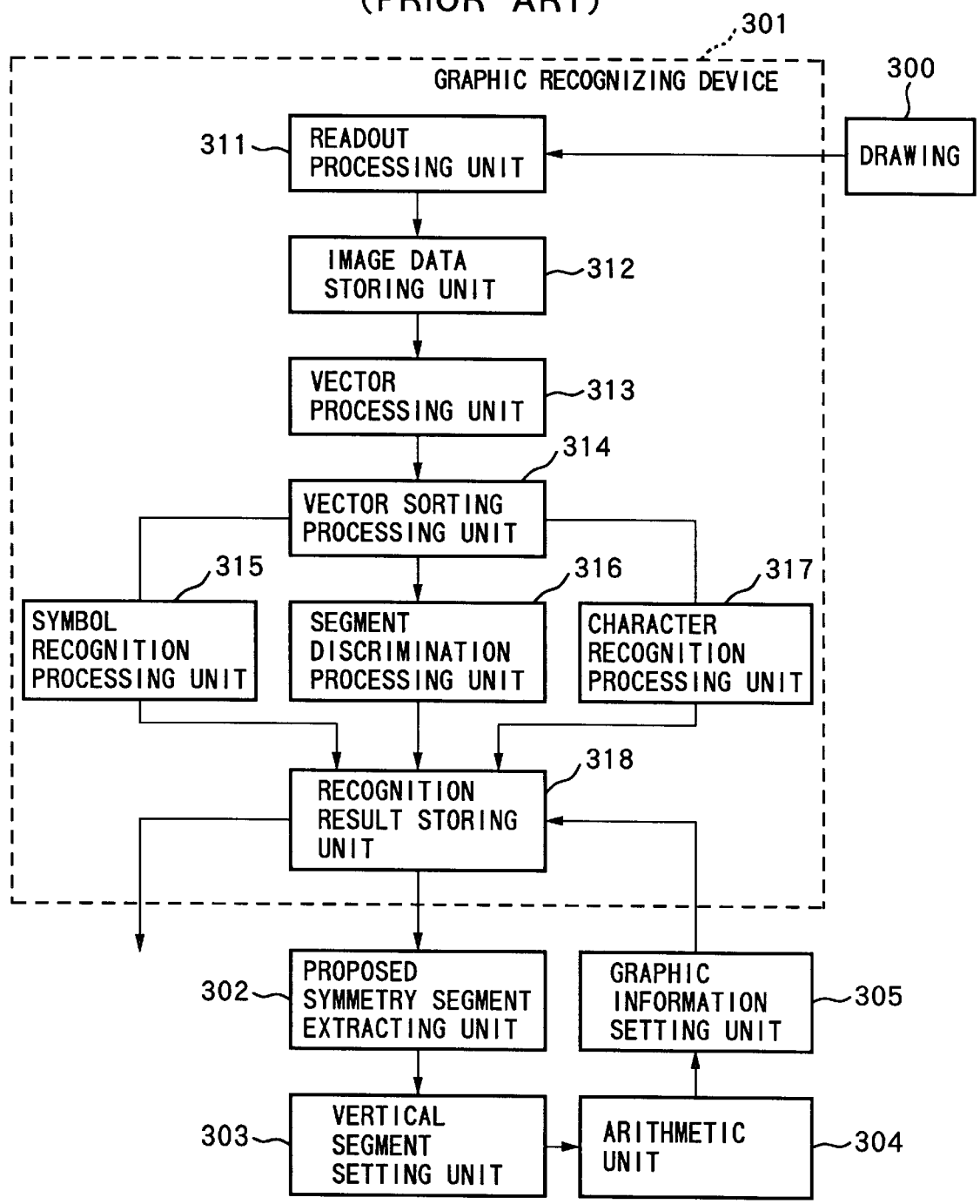
FIG. 19 is a block diagram showing a constitution of a graphic arrangement device according to a third example of the conventional arts.
Figure 20:
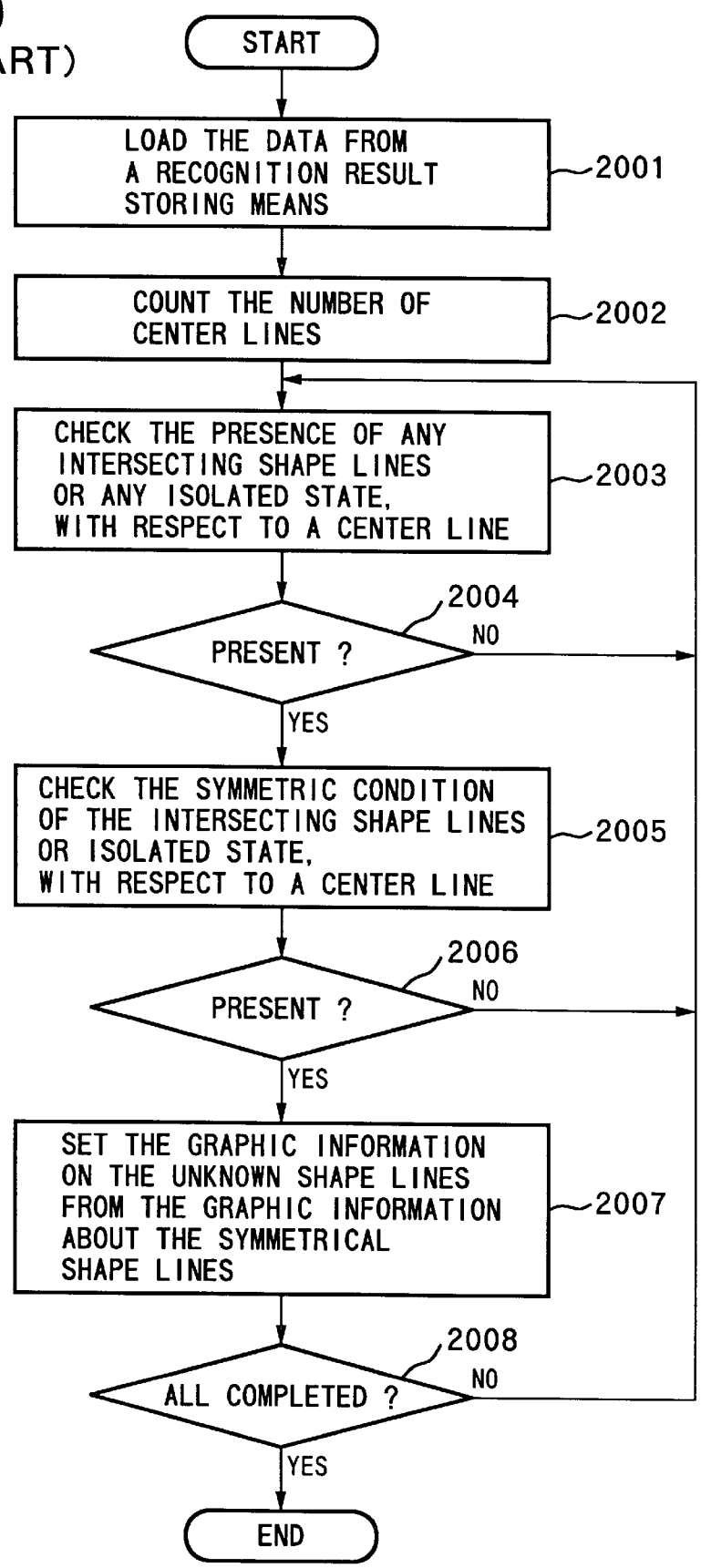
FIG. 20 is a flow chart showing an operation of the graphic arrangement device according to the third example of the conventional arts.
Figure 21:
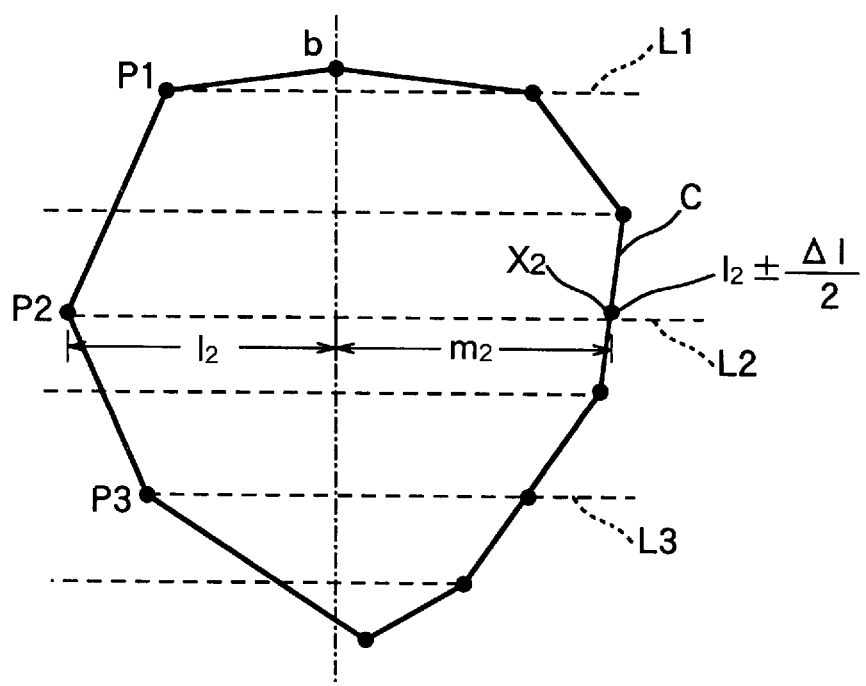
FIG. 21 is a view showing a method of judging symmetric condition of a shape line intersecting a center line in the graphic arrangement device of the third example of the conventional arts.

As illustrated in FIG. 12, of the whole operation of the fourth embodiment, a sequential operation to the step of creating the characteristic point group by the characteristic point group computing unit 27 (Step 1207) is similar to an operation to Step 207 in the first embodiment indicated in FIG. 2, thereby omitting the description thereof.

When the characteristic point groups are created by the characteristic point group computing unit 27, a user specifies a characteristic point for use of computing the relative position thereof about a symmetry axis first by the use of the characteristic point group representative point specifying unit 60 (Steps 1208 and 1209). The characteristic point position computing unit 28 computes the distance "α" between a base point and the characteristic point specified from a characteristic point group by the characteristic point group representative point specifying unit 60, and the distance "β" between the same characteristic point and a symmetry axis located at the nearest distance to the same characteristic point (Step 1210).

The symmetry position characteristic point computing unit 29 of the data processing unit 50 judges whether a characteristic point group to be processed is to be placed on a symmetry axis. When the characteristic point group is not placed on a symmetry axis, the unit 29 computes a symmetrical position of the selected characteristic point with respect to the symmetry axis, and another characteristic point located at the nearest position to the computed position is moved to the computed position (Steps 1211 and 1212). As for the rest of the characteristic points of the characteristic point group, it is judged whether a characteristic point is to be placed on a symmetry axis or not. If it is not placed on the symmetry axis, a characteristic point located at the symmetrical position is automatically moved to the symmetrical position.

As described above, the line symmetrical graphic arrangement device of the present invention requires the symmetry axes, with respect to an input graphic judged to be approximately symmetric with some symmetry axes, on the basis of the shape of the input graphic and the characteristic of the symmetry axes, and locates a characteristic point of the input graphic with each obtained symmetry axis as a reference, thereby to arrange the input graphic into a line symmetrical figure with respect to all the symmetry axes included in the input graphic. Therefore, it has an effect to create a line symmetrical graphic with respect to any symmetry axes, independently of the number of axes.

As mentioned above, the line symmetrical graphic arrangement device of the present invention is capable of arranging various general symmetrical graphics, in which device it does not matter whether the input graphic is a regular polygon or not, because the device requires the symmetry axes, on the basis of the shape of the input graphic, so as to arrange the graphic.

Since the line symmetrical graphic arrangement device of the present invention necessitates no external reference such as X-Y axes in the process of the graphic arrangement, it does not matter whether the input graphic is inclined to a symmetry axis or not, but the device can perform the arrangement processing on the input graphics of any shape.

Since the line symmetrical graphic arrangement device of the present invention automatically judges the symmetric condition in the graphic entered by a user and arranges the input graphic into a line symmetrical figure with respect to all the symmetry axes included in the input graphic, it is capable of arranging the graphic entered by a user by means of handwriting without consciousness of symmetry strictly, into a line symmetrical figure, thereby to reduce the user's trouble.

The line symmetrical graphic arrangement device of the present invention is capable of performing a graphic arrangement at higher speed by simultaneously locating two characteristic points in pair which are placed at the symmetrical positions with respect to a symmetry axis.

The line symmetrical graphic arrangement device of the present invention is capable of creating line symmetrical graphics serving users' wishes more exactly by enabling users to specify a characteristic point which is a reference in the graphic arrangement.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said proposed symmetry axis detecting means comprises a first proposed symmetry axis detecting means for detecting first proposed symmetry axes based on the characteristic of the shape and the quality of the symmetry axes in the input graphic which are specified by the characteristic quantity, and a symmetry judging means for judging whether the input graphic is approximately symmetrical with the respective first proposed symmetry axes detected by said first proposed symmetry axis detecting means as reference, and fixing the first proposed symmetry axes as second proposed symmetry axes to be processed by said symmetry axis modifying means when judging that the input graphic is approximately symmetrical.

2. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic.

3. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said proposed symmetry axis detecting means comprises a first proposed symmetry axis detecting means for detecting first proposed symmetry axes based on the characteristic of the shape and the quality of the symmetry axes in the input graphic which are specified by the characteristic quantity, and a symmetry judging means for judging whether the input graphic is approximately symmetrical with the respective first proposed symmetry axes detected by said first proposed symmetry axis detecting means as reference, and fixing the first proposed symmetry axes as second proposed symmetry axes to be processed by said symmetry axis modifying means when judging that the input graphic is approximately symmetrical, while said symmetry axis modifying means comprises a base point computing means for computing base points with reference to the second proposed symmetry axes detected by said proposed symmetry axis detecting means, the base points being fixed about the proposed symmetry axes by the intersections thereof when there are a plurality of the second proposed symmetry axes, and more particularly, the base points being fixed about the proposed symmetry axes by a center of a circumscribed graphic including the intersections thereof when there are a plurality of intersections of the second proposed symmetry axes, or there exists only one second proposed symmetry axis, and an axis angle deciding means for modifying the angle formed by the adjacent second proposed symmetry axes so that the second proposed symmetry axes are relocated at the same angle around the base point obtained by said base point computing means, thereby to decide the symmetry axes of the input graphic.

4. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic, while said characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, said characteristic point position computing means including the step of requiring the distance between a characteristic point of the characteristic point group and the base point about the symmetry axes, and the distance between the characteristic point and a symmetry axis located at the nearest position to the characteristic point, and the step of computing the positions of the other characteristic points by applying the relative position of the characteristic point specified by the two distances with respect to the symmetry axis, to the other characteristic points of the characteristic point group and the other symmetry axes.

5. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said proposed symmetry axis detecting means comprises a first proposed symmetry axis detecting means for detecting first proposed symmetry axes based on the characteristic of the shape and the quality of the symmetry axes in the input graphic which are specified by the characteristic quantity, and a symmetry judging means for judging whether the input graphic is approximately symmetrical with the respective first proposed symmetry axes detected by said first proposed symmetry axis detecting means as reference, and fixing the first proposed symmetry axes as second proposed symmetry axes to be processed by said symmetry axis modifying means when judging that the input graphic is approximately symmetrical, said symmetry axis modifying means comprises a base point computing means for computing base points with reference to the second proposed symmetry axes detected by said proposed symmetry axis detecting means, the base points being fixed about the proposed symmetry axes by the intersections thereof when there are a plurality of the second proposed symmetry axes, and more particularly, the base points being fixed about the proposed symmetry axes by a center of a circumscribed graphic including the intersections thereof when there are a plurality of intersections of the second proposed symmetry axes, or there exists only one second proposed symmetry axis, and an axis angle deciding means for modifying the angle formed by the adjacent second proposed symmetry axes so that the second proposed symmetry axes are relocated at the same angle around the base point obtained by said base point computing means, thereby to decide the symmetry axes of the input graphic, and said characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, said characteristic point position computing means including the step of requiring the distance between a characteristic point of the characteristic point group and the base point about the symmetry axes, and the distance between the characteristic point and a symmetry axis located at the nearest position to the characteristic point, and the step of computing the positions of the other characteristic points by applying the relative position of the characteristic point specified by the two distances with respect to the symmetry axis, to the other characteristic points of the characteristic point group and the other symmetry axes.

6. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic, while said characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, said characteristic point position computing means including the step of requiring the distance between a characteristic point of the characteristic point group and the base point about the symmetry axes, and the distance between the characteristic point and a symmetry axis located at the nearest position to the characteristic point, the step of locating the other characteristic point which is located at the nearest position, to the symmetrical position of the characteristic point with respect to the symmetry axis when the characteristic point is not located on the symmetry axis, and repeating the above step of requiring the position of a characteristic point and the above step of locating the other characteristic point to the symmetrical position of the computed characteristic point, with respect to all the characteristic points of the characteristic point group.

7. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said proposed symmetry axis detecting means comprises a first proposed symmetry axis detecting means for detecting first proposed symmetry axes based on the characteristic of the shape and the quality of the symmetry axes in the input graphic which are specified by the characteristic quantity, and a symmetry judging means for judging whether the input graphic is approximately symmetrical with the respective first proposed symmetry axes detected by said first proposed symmetry axis detecting means as reference, and fixing the first proposed symmetry axes as second proposed symmetry axes to be processed by said symmetry axis modifying means when judging that the input graphic is approximately symmetrical, while said symmetry axis modifying means comprises a base point computing means for computing base points with reference to the second proposed symmetry axes detected by said proposed symmetry axis detecting means, the base points being fixed about the proposed symmetry axes by the intersections thereof when there are a plurality of the second proposed symmetry axes, and more particularly, the base points being fixed about the proposed symmetry axes by a center of a circumscribed graphic including the intersections thereof when there are a plurality of intersections of the second proposed symmetry axes, or there exists only one second proposed symmetry axis, and an axis angle deciding means for modifying the angle formed by the adjacent second proposed symmetry axes so that the second proposed symmetry axes are relocated at the same angle around the base point obtained by said base point computing means, thereby to decide the symmetry axes of the input graphic, while said characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, said characteristic point position computing means including the step of requiring the distance between a characteristic point of the characteristic point group and the base point about the symmetry axes, and the distance between the characteristic point and a symmetry axis located at the nearest position to the characteristic point, the step of locating the other characteristic point which is located at the nearest position, to the symmetrical position of the characteristic point with respect to the symmetry axis when the characteristic point is not located on the symmetry axis, and repeating the above step of requiring the position of a characteristic point and the above step of locating the other characteristic point to the symmetrical position of the computed characteristic point, with respect to all the characteristic points of the characteristic point group.

8. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic Quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic, while said characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, said characteristic point position computing means including the step of, with respect to a characteristic point specified by a user from the characteristic point group, requiring the distance between the characteristic point and the base point about the symmetry axes, and the distance between the characteristic point and a symmetry axis located at the nearest position to the characteristic point, and the step of computing the positions of the other characteristic points by applying the relative position of the characteristic point specified by the two distances with respect to the symmetry axis, to the other characteristic points of the characteristic point group and the other symmetry axes.

9. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said proposed symmetry axis detecting means comprises a first proposed symmetry axis detecting means for detecting first proposed symmetry axes based on the characteristic of the shape and the quality of the symmetry axes in the input graphic which are specified by the characteristic quantity, and a symmetry judging means for judging whether the input graphic is approximately symmetrical with the respective first proposed symmetry axes detected by said first proposed symmetry axis detecting means as reference, and fixing the first proposed symmetry axes as second proposed symmetry axes to be processed by said symmetry axis modifying means when judging that the input graphic is approximately symmetrical, while said symmetry axis modifying means comprises a base point computing means for computing base points with reference to the second proposed symmetry axes detected by said proposed symmetry axis detecting means, the base points being fixed about the proposed symmetry axes by the intersections thereof when there are a plurality of the second proposed symmetry axes, and more particularly, the base points being fixed about the proposed symmetry axes by a center of a circumscribed graphic including the intersections thereof when there are a plurality of intersections of the second proposed symmetry axes, or there exists only one second proposed symmetry axis, and an axis angle deciding means for modifying the angle formed by the adjacent second proposed symmetry axes so that the second proposed symmetry axes are relocated at the same angle around the base point obtained by said base point computing means, thereby to decide the symmetry axes of the input graphic, while said characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, said characteristic point position computing means including the step of, with respect to a characteristic point specified by a user from the characteristic point group, requiring the distance between the characteristic point and the base point about the symmetry axes, and the distance between the characteristic point and a symmetry axis located at the nearest position to the characteristic point, and the step of computing the positions of the other characteristic points by applying the relative position of the characteristic point specified by the two distances with respect to the symmetry axis, to the other characteristic points of the characteristic point group and the other symmetry axes.

10. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement;

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said symmetry axis modifying means comprises a base point computing means for computing base points with reference to the proposed symmetry axes detected by said proposed symmetry axis detecting means, the base points being fixed about the proposed symmetry axes by the intersections thereof when there are a plurality of proposed symmetry axes, and more particularly, the base points being fixed about the proposed symmetry axes by a center of a circumscribed graphic including the intersections thereof when there are a plurality of intersections of the symmetry axes, or there exists only one proposed symmetry axis, and an axis angle deciding means for modifying the angle formed by the adjacent proposed symmetry axes so that the proposed symmetry axes are relocated at the same angle around the base point obtained by said base point computing means, thereby to decide the symmetry axes of the input graphic, while said characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, said characteristic point position computing means including the step of, with respect to a characteristic point specified by a user from the characteristic point group, requiring the distance between the characteristic point and the base point about the symmetry axes, and the distance between the characteristic point and a symmetry axis located at the nearest position to the characteristic point, the step of locating the other characteristic point which is located at the nearest position, to the symmetrical position of the characteristic point with respect to the symmetry axis, when the characteristic point is not located on the symmetry axis, the step of computing the positions of the other characteristic points by applying the relative position of the characteristic point specified by the two distances with respect to the symmetry axis, to the other characteristic points of the characteristic point group and the other symmetry axes, and repeating the above step of locating the other characteristic point to the symmetrical position of the computed characteristic point, with respect to all the characteristic points of the characteristic point group.

11. A line symmetrical graphic arrangement device for arranging an input graphic into a line symmetrical figure with respect to a symmetry axis, comprising:

a characteristic quantity computing means for computing characteristic quantity depending on the input graphic and selecting characteristic points used for the graphic arrangement:

a proposed symmetry axis detecting means for requiring proposed symmetry axes of the input graphic based on the characteristic of the shape and the quality of the symmetry axes in the input graphic, which are specified by the characteristic quantity computed by said characteristic quantity computing means;

a symmetry axis modifying means for modifying the proposed symmetry axes detected by said proposed symmetry axis detecting means according to the quality of the symmetry axes, to obtain the symmetry axes of the input graphic; and a characteristic point relocating means for relocating the characteristic points selected by said characteristic quantity computing means with the respective symmetry axes obtained by said symmetry axis modifying means as reference, so to create a symmetrical graphic with respect to the symmetry axes, and wherein said proposed symmetry axis detecting means comprises a first proposed symmetry axis detecting means for detecting first proposed symmetry axes based on the characteristic of the shape and the quality of the symmetry axes in the input graphic which are specified by the characteristic quantity, and a symmetry judging means for judging whether the input graphic is approximately symmetrical with the respective first proposed symmetry axes detected by said first proposed symmetry axis detecting means as reference, and fixing the first proposed symmetry axes as second proposed symmetry axes to be processed by said symmetry axis modifying means when judging that the input graphic is approximately symmetrical, while said symmetry axis modifying means comprises a base point computing means for computing base points with reference to the second proposed symmetry axes detected by said proposed symmetry axis detecting means, the base points being fixed about the proposed symmetry axes by the intersections thereof when there are a plurality of the second proposed symmetry axes, and more particularly, the base points being fixed about the proposed symmetry axes by a center of a circumscribed graphic including the intersections thereof when there are a plurality of intersections of the second proposed symmetry axes, or there exists only one second proposed symmetry axis, and an axis angle deciding means for modifying the angle formed by the adjacent second proposed symmetry axes so that the second proposed symmetry axes are relocated at the same angle around the base point obtained by said base point computing means, thereby to decide the symmetry axes of the input graphic, while said characteristic point relocating means comprises a characteristic point group creating means for creating a characteristic point group by gathering the characteristic points located at the same distance from the base point about the proposed symmetry axes computed by said base point computing means, of all the characteristic points selected by said characteristic quantity computing means, and a characteristic point position computing means for computing the positions of the characteristic points for every characteristic point group created by said characteristic point group creating means, said characteristic point position computing means including the step of, with respect to a characteristic point specified by a user from the characteristic point group, requiring the distance between the characteristic point and the base point about the symmetry axes, and the distance between the characteristic point and a symmetry axis located at the nearest position to the characteristic point, the step of locating the other characteristic point which is located at the nearest position, to the symmetrical position of the characteristic point with respect to the symmetry axis, when the characteristic point is not located on the symmetry axis, and the step of computing the positions of the other characteristic points by applying the relative position of the characteristic point specified by the two distances with respect to the symmetry axis, to the other characteristic points of the characteristic point group and the other symmetry axes, and repeating the above step of locating the other characteristic point to the symmetrical position of the computed characteristic point, with respect to all the characteristic points of the characteristic point group.

\* \* \* \* \*